United States Patent
Nakamura et al.

(10) Patent No.: US 9,513,825 B2
(45) Date of Patent: *Dec. 6, 2016

(54) STORAGE SYSTEM HAVING A CHANNEL CONTROL FUNCTION USING A PLURALITY OF PROCESSORS

(71) Applicant: Hitachi, Ltd., Tokyo (JP)

(72) Inventors: Shuji Nakamura, Yokohama (JP); Akira Fujibayashi, Sagamihara (JP); Mutsumi Hosoya, Fujimi (JP)

(73) Assignee: HITACHI, LTD., Tokyo (JP)

( * ) Notice: Subject to any disclaimer, the term of this patent is extended or adjusted under 35 U.S.C. 154(b) by 43 days.

This patent is subject to a terminal disclaimer.

(21) Appl. No.: 14/492,107

(22) Filed: Sep. 22, 2014

(65) Prior Publication Data

US 2016/0085463 A1 Mar. 24, 2016
US 2016/0196077 A9 Jul. 7, 2016

Related U.S. Application Data

(63) Continuation of application No. 13/688,483, filed on Nov. 29, 2012, now Pat. No. 8,843,703, which is a (Continued)

(30) Foreign Application Priority Data

Feb. 15, 2006 (JP) ................. 2006-037958

(51) Int. Cl.
*G06F 3/06* (2006.01)
*H04L 29/08* (2006.01)
(Continued)

(52) U.S. Cl.
CPC ............ *G06F 3/0619* (2013.01); *G06F 3/067* (2013.01); *G06F 3/0613* (2013.01);
(Continued)

(58) Field of Classification Search
CPC ............ G06F 2003/0697; G06F 3/0604; G06F 3/0658; G06F 3/06; G06F 3/0601; G06F 3/0628; G06F 3/0655; G06F 3/067; G06F 3/0605; G06F 3/0659; G06F 3/0613; G06F 3/0689
See application file for complete search history.

(56) References Cited

U.S. PATENT DOCUMENTS 5,941,972 A 8/1999 Hoese et al.
6,484,245 B1 11/2002 Sanada et al.
(Continued)

FOREIGN PATENT DOCUMENTS

| JP | 2000-339226 | 12/2000 |
|---|---|---|
| JP | 2004-240949 | 8/2004 |
| JP | 2005-165440 | 6/2005 |

*Primary Examiner* — Jared Rutz
*Assistant Examiner* — Jean Edouard
(74) *Attorney, Agent, or Firm* — Baker Botts L.L.P.

(57) ABSTRACT

Storage system: wherein processor number information includes at least one logical unit number and at least one processor number of storage nodes; wherein transfer list index/processor number information includes a processor number for identifying a processor from among processors of the plurality of storage nodes, and index information for identifying a transfer list including instruction which the processor sends to the protocol processor; wherein a local router determines a first processor from among the processors of the plurality of storage nodes which is to be a transfer destination of a write request based on processor number information in response to the write request from the host computer through the protocol processor; wherein the first processor generates and sends to the protocol processor a first transfer list which includes instruction for processing, and generates first index information which is an index of the first transfer list upon receiving the write request.

6 Claims, 27 Drawing Sheets

Related U.S. Application Data continuation of application No. 11/396,676, filed on Apr. 4, 2006, now Pat. No. 8,423,677.

(51) Int. Cl.
*H04L 12/931* (2013.01)
*H04L 29/06* (2006.01)

(52) U.S. Cl.
CPC .......... *G06F 3/0656* (2013.01); *G06F 3/0658* (2013.01); *G06F 3/0665* (2013.01); *G06F 3/0676* (2013.01); *G06F 3/0689* (2013.01); *H04L 67/1002* (2013.01); *H04L 67/1097* (2013.01); *H04L 49/357* (2013.01); *H04L 69/08* (2013.01)

(56) References Cited

U.S. PATENT DOCUMENTS

| | | | |
|---|---|---|---|
| 6,791,989 B1* | 9/2004 | Steinmetz | G06F 13/385 370/394 |
| 6,898,670 B2* | 5/2005 | Nahum | G06F 3/0607 709/212 |
| 7,685,254 B2* | 3/2010 | Pandya | G06F 17/30985 370/389 |
| 2001/0011332 A1* | 8/2001 | Sanada | G06F 3/0622 711/152 |
| 2003/0189936 A1 | 10/2003 | Terrell et al. | |
| 2003/0191857 A1* | 10/2003 | Terrell | H04L 45/00 709/244 |
| 2004/0028063 A1 | 2/2004 | Roy et al. | |
| 2004/0064590 A1* | 4/2004 | Starr | H04L 29/06 709/250 |
| 2004/0148461 A1* | 7/2004 | Steinmetz | G06F 3/0607 711/114 |
| 2005/0033912 A1* | 2/2005 | Abe | G06F 3/0605 711/114 |
| 2005/0044267 A1 | 2/2005 | Dropps et al. | |
| 2005/0066045 A1 | 3/2005 | Johnson et al. | |
| 2005/0120176 A1 | 6/2005 | Maeda et al. | |
| 2006/0029076 A1* | 2/2006 | Namihira | H04L 29/1233 370/392 |
| 2006/0221824 A1* | 10/2006 | Anzai | G06F 11/1464 370/229 |
| 2007/0076685 A1* | 4/2007 | Seto | G06F 3/0613 370/351 |

\* cited by examiner

| | INPUT FRM | | | PR NUMBER |
|---|---|---|---|---|
| S_ID | LUN | LBA | | |
| 0x000001 | 1 | ALL | | 1 |
| 0x000001 | 2 | 0x0000~0x01fff | | 2 |
| 0x000001 | 2 | 0x0200~0xf000 | | 3 |
| 0x000213 | 4~12 | ALL | | 2 |
| ALL | 3 | ALL | | 4 |
| ... | ... | ... | | ... |

626
PR NUMBER TABLE

| PR NUMBER | BASE ADDRESS | | PIDX | | CIDX | |
|---|---|---|---|---|---|---|
| | FRM FIFO | MSG FIFO | FRM FIFO | MSG FIFO | FRM FIFO | MSG FIFO |
| 1 | 100000 | 110000 | 11 | 23 | 10 | 23 |
| 2 | 200000 | 210000 | 41 | 43 | 41 | 38 |
| 3 | 300000 | 310000 | 5 | 5 | 5 | 5 |
| 4 | 400000 | 410000 | 40 | 95 | 13 | 41 |
| 5 | 500000 | 510000 | 40 | 95 | 41 | 96 |
| ... | ... | ... | ... | ... | ... | ... |

6291  6292  6293  6294  6295  6296  6297

TRANSMISSION DESTINATION ADDRESS TABLE

*FIG. 14*

| TRANSFER LIST INDEX | VALID | PR NUMBER | INDEX FOR PR |
|---|---|---|---|
| 0 | TRUE | 1 | 123 |
| 1 | TRUE | 14 | 11 |
| 2 | TRUE | 11 | 234 |
| 3 | FALSE | 3 | 2523 |
| 4 | TRUE | 5 | 54 |
| 5 | TRUE | 5 | 22 |
| 6 | TRUE | 7 | 634 |
| ... | ... | ... | ... |

6280
TRANSFER LIST INDEX/PR NUMBER TABLE

*FIG. 15*

STORAGE SYSTEM HAVING A CHANNEL CONTROL FUNCTION USING A PLURALITY OF PROCESSORS

CROSS REFERENCE TO RELATED APPLICATION

This is a continuation of U.S. application Ser. No. 13/688,483, filed Nov. 29, 2012, which is a continuation of U.S. application Ser. No. 11/396,676, filed Apr. 4, 2006 (now U.S. Pat. No. 8,423,677). This application relates to and claims priority from Japanese Patent Application No. 2006-037958, filed on Feb. 15, 2006. The entirety of the contents and subject matter of all of the above is incorporated herein by reference.

BACKGROUND

This invention relates to a storage system connected to a host computer via a channel, and more particularly, to a technology for controlling the channel by a plurality of processors.

In recent years, there are many cases where a single large-scale storage replaces a plurality of storage systems. Moreover, there has been employed a technology for making a plurality of storage systems recognized as a single large-scale storage system. These technologies facilitate management of the storage system. In these cases, the large-scale storage system is required to achieve higher performance as well as an increase in storage capacity.

On the other hand, there exists a need for extending an inexpensive small-scale storage system to a large-scale storage system.

As technologies to support the extension of the system from small scale to large scale, there have been known a virtualization switch technology and a highly scalable technology.

For example, the virtualization switch technology is disclosed in U.S. Pat. No. 6,898,670. According to the virtualization switch technology, a SAN switch which constitutes a SAN (Storage Area Network) provides a virtualization function. Specifically, the virtualization switch technology provides a host computer with a plurality of storage systems connected the virtualization switch as a signal storage system. Moreover, the virtualization switch provides various functions to the plurality of storage systems connected to the virtualization switch.

In this case, however, an administrator has to respectively perform settings for the virtualization switch and the plurality of storage systems. Moreover, a conversion process for the virtualization carried out by the virtualization switch becomes a bottleneck in performance of the storage system.

The highly scalable technology of the storage system is disclosed in JP 2004-240949 A. A highly scalable storage system includes a large number of processors for controlling the highly scalable storage system. Moreover, the highly scalable storage system includes a large number of protocol processors.

The protocol processor is disclosed in U.S. Pat. No. 6,791,989. The protocol processor processes a protocol of a channel for connecting a host computer and a storage system to each other. Specifically, the protocol processor converts a protocol of a packet or a frame received via the channel into an internal protocol of the storage system.

When the storage system is highly scalable, the storage system can be extended from a small-scale configuration to a large-scale configuration. Accordingly, it is possible to provide a storage system according to a scale requested by a user.

SUMMARY

However, a conventional storage system has the following problems. The protocol processor provides only one or a small number of processors with the function of controlling a channel. As a result, in a highly scalable storage system, even when there are a large number of processors, all processors are not efficiently utilized.

Moreover, the capability of the protocol processor is insufficient, which hinders efficiency from being increased in processing carried out by the processors.

It is therefore an object of this invention to provide a storage system in which processors are efficiently utilized.

According to the representative aspect of this invention, there is provided a storage system connected to a host computer via a channel comprising: plural protocol processors connected to the channel for transmitting and receiving a frame to and from the host computer; plural processors for controlling the channel; a local router connected to the protocol processor and to the processor; a first memory connected to the local router; and a disk drive for storing data which is required to be written by the host computer, in which: the protocol processor transmits, upon transmitting the frame to the host computer, information on a transmission state of the transmitted frame to the local router; the local router determines, upon the protocol processor receiving the frame, which of the processors processes the received frame, based on a subject to which the received frame requests for an access; the local router transfers the received frame to the determined processor; the local router determines, upon the protocol processor transmitting the frame, which of the processors processes the information on the transmission state of the transmitted frame, based on an exchange of the transmitted frame; and the local router transfers the information on the transmission state of the transmitted frame to the determined processor.

According to the representative aspect of this invention, the plurality of processors control one channel. As a result, in the storage system according to the representative aspect of this invention, processor resources can be efficiently utilized.

BRIEF DESCRIPTION OF THE DRAWINGS

The present invention can be appreciated by the description which follows in conjunction with the following figures, wherein:

FIG. 13 is a configuration diagram of the processor number table according to the first embodiment of this invention;

FIG. 14 is a configuration diagram of the transmission destination address table according to the first embodiment of this invention;

FIG. 15 is a configuration diagram of the transfer list index/processor number table according to the first embodiment of this invention;

DETAILED DESCRIPTION OF THE PREFERRED EMBODIMENTS

A description will now be given of embodiments of this invention with reference to the drawings.

(First Embodiment)

Figure 1:
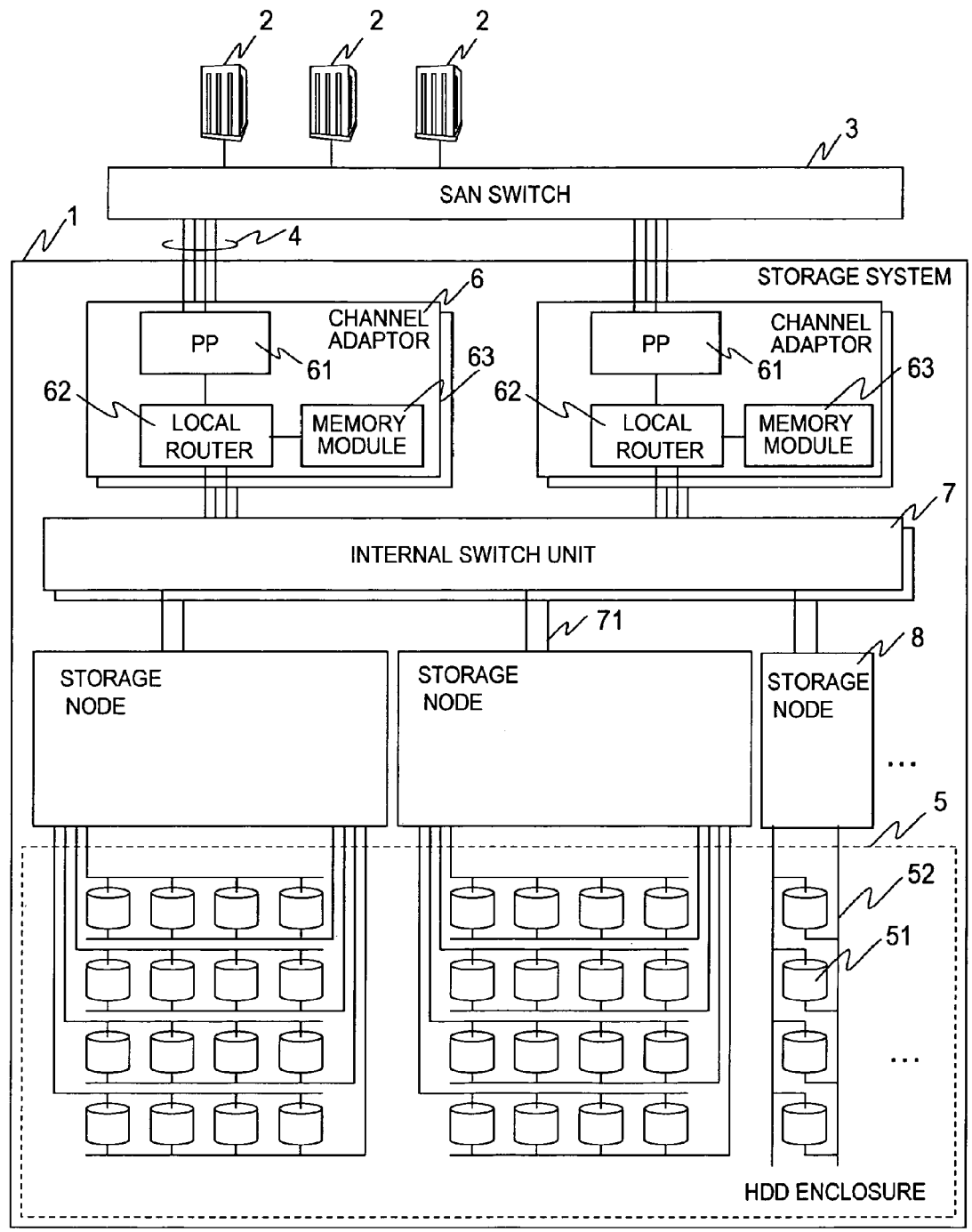
FIG. 1 is a block diagram of a configuration of a computer system according to a first embodiment of this invention.

FIG. 1 is a block diagram of a configuration of a computer system according to a first embodiment of this invention.

The computer system includes a storage system 1, host computers 2, and a SAN switch 3.

The storage system 1 and the SAN switch 3 are connected with each other via channels 4. Similarly, the host computers 2 and the SAN switch 3 are connected with each other via the channels 4. It should be noted that the Fibre Channel (FC) protocol is used on the channels 4 according to the first embodiment. A protocol other than the Fibre Channel protocol may be used on the channels 4.

The SAN switch 3 is a switch which constitutes a SAN (Storage Area Network). The SAN switch 3 controls communication between the storage system 1 and the host computers 2.

The storage system 1 includes hard disk drive enclosures (HDD enclosure) 5, channel adaptors 6, internal switch units 7, and storage nodes 8.

The internal switch 7 connects the channel adaptor 6 and the storage node 8 with each other. It should be noted that the channel adaptors 6 and the internal switch units 7 are connected via internal paths 71. Similarly, the storage nodes 8 and the internal switch units 7 are connected via the internal paths 71.

The HDD enclosure 5 includes a plurality of hard disk drives (HDD's) 51. The HDD 51 stores, for example, data which is required to be written by the host computer 2. It should be noted that the HDD's 51 may or may not be configured as a RAID (Redundant Array of Independent Disks).

The channel adaptor 6 includes a protocol processor 61, a local router 62, and a memory module 63.

The protocol processor 61 is connected to the channels 4. Moreover, the protocol processor 61 is connected to the local router 62 and the like via a PCI (Peripheral Components Interconnect) bus, a PCI-Express, or the like.

The protocol processor 61 controls the protocol of the channels 4. Specifically, the protocol processor 61 mutually converts the protocol of the channels 4 and an internal protocol of the storage system 1. Accordingly, the protocol processor 61 can transmit a frame to the channel 4. Similarly, the protocol processor 61 receives a frame from the channel 4. When a protocol other than the Fiber Channel protocol is used on the channels 4, the protocol processor 61 transmits/receives a packet in place of a frame.

The local router 62 selects a processor, which is a transfer destination of the frame processed by the protocol processor 61, from the processors provided for the storage nodes 8. Then, the local router 62 transfers the frame processed by the protocol processor 61 to the selected processor. It should be noted that a detailed description will be given of the local router 62 with reference to FIG. 12.

The memory module 63 stores programs to be executed by the local router 62 and information to be required by the local router 62. Specifically, the memory module 63 stores a processor number table shown in FIG. 13, a transmission destination address table shown in FIG. 14, and a transfer list index/processor number table shown in FIG. 15. When the local router 62 is configured by an LSI, the memory module 63 does not store programs. Moreover, a part of the memory module 63 is used as a request FIFO (First-In First-Out buffer). It should be noted that a detailed description will be given of the request FIFO with reference to FIG. 8.

The storage node 8 is connected to the HDD's 51 via HDD channels 52. It should be noted that a detailed description will be given of the storage node 8 with reference to FIG. 2.

Figure 2:
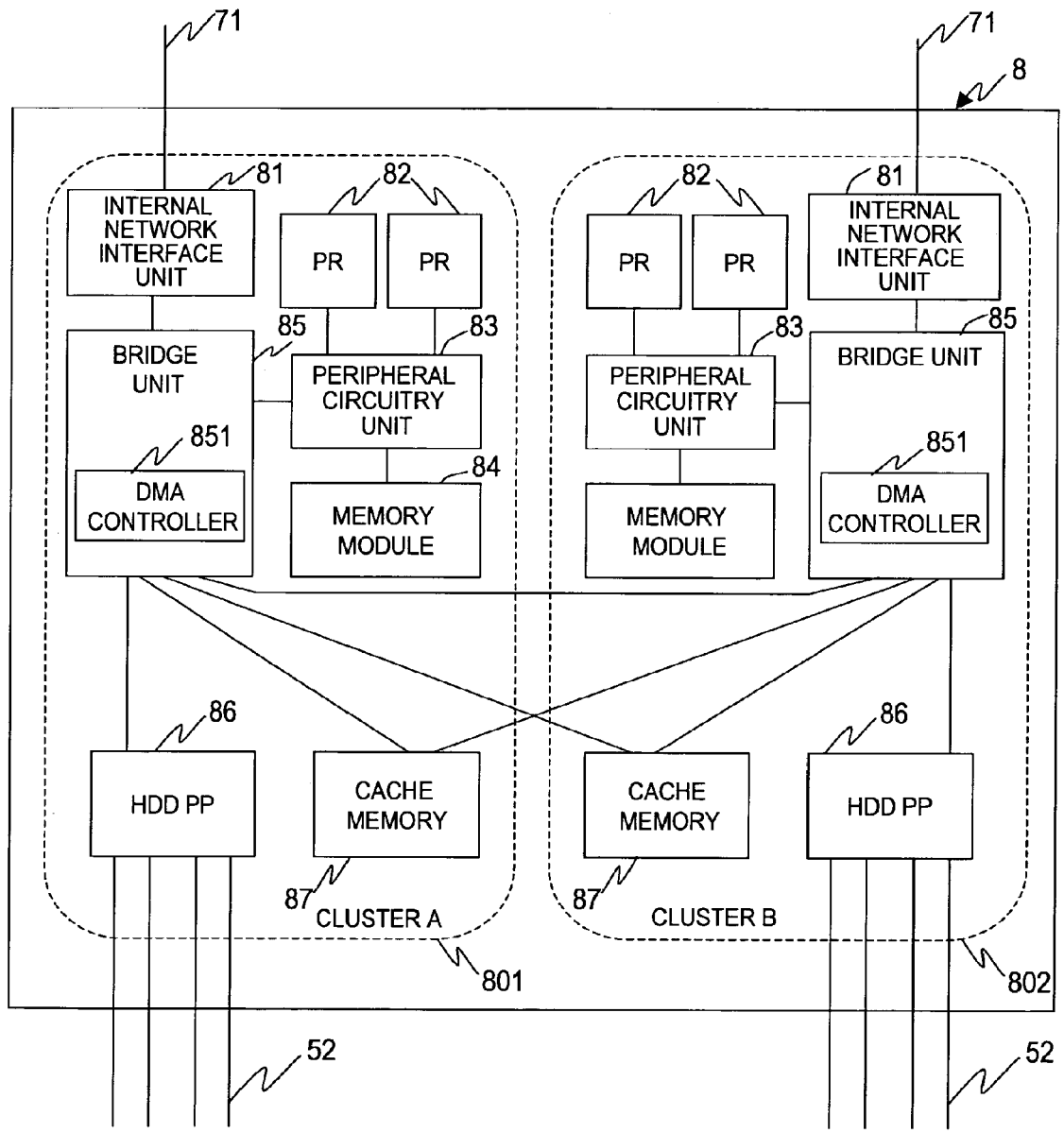
FIG. 2 is a block diagram of a configuration of the storage node provided for the storage system according to the first embodiment of this invention.

FIG. 2 is a block diagram of a configuration of the storage node 8 provided for the storage system 1 according to the first embodiment of this invention.

The storage node 8 includes an internal network interface unit (internal network I/F unit) 81, processors 82, a peripheral circuitry unit 83, a memory module 84, a bridge unit 85, an HDD protocol processor 86, and a cache memory 87.

The internal network interface unit 81 is connected to the internal switch 7 via the internal path 71.

The bridge unit 85 mutually connects the internal network interface unit 81, the peripheral circuitry unit 83, the HDD protocol processor 86, and the cache memory 87 with one another. Moreover, the bridge unit 85 includes a DMA controller 851. The DMA controller 851 controls a data transfer process through the bridge unit 85.

The HDD protocol processor 86 is connected to the HDD channels 52. The HDD protocol processor 86 controls the HDD's 51 via the HDD channels 52.

The peripheral circuitry unit 83 is, for example, a chip set. The peripheral circuitry unit 83 mutually connects the processors 82, the memory module 84, and the bridge unit 85 with one another. Moreover, the peripheral circuitry unit 83 provides functions required by the processors 82 to execute a program. For example, the peripheral circuitry unit 83 provides the processors 82 with a timer function. Moreover, the peripheral circuitry unit 83 controls the memory module 84.

The memory module 84 stores, for example, programs to be executed by the processor 82 and information to be required by the processor 82. Specifically, the memory module 84 stores programs to be used to control the storage system 1, information on the configuration of the storage system 1, information on directories of the cache memory 87, and the like. It should be noted that the information on the configuration of the storage system 1 and the information on the directories of the cache memory 87 may be stored in the cache memory 87. When a part of the memory module 84 is used as a communication area, the processor 82 may carry out processes while communicating with other processors 82.

Moreover, a part of the memory module 84 is used as a frame FIFO and a message FIFO. It should be noted that a detailed description will be given of the frame FIFO with reference to FIG. 10, and that a detailed description will be given of the message FIFO with reference to FIG. 9.

The cache memory 87 temporarily stores data to which the host computer 2 has issued a write request or a read request.

In order to increase an availability of the storage system 1, the configuration of the storage node 8 may be redundant. The storage node 8 in FIG. 2 includes a cluster A801 to which a power source unit A supplies an electric power, and a cluster B802 to which a power source unit B supplies an electric power. The clusters A801 and B802 respectively include the internal network interface unit 81, the processors 82, the peripheral circuitry unit 83, the memory module 84, the bridge unit 85, the HDD protocol processor 86, and the cache memory 87. It should be noted that the DMA controller 851 of the bridge unit 85 stores data both in the cache memory 87 provided for the cluster A801 and the cache memory 87 provided for the cluster B802.

As a result, even when one of the clusters fails, the data is not lost. Moreover, the other cluster which is normally operating can continue processes.

The processor 82 executes the programs stored in the memory module 84 to carry out various types of processing. As a result, the processor 82 controls the storage system 1.

The processor 82 uses the frame FIFO, the request FIFO, and the message FIFO to communicate with the protocol processor 61 provided for the channel adaptor 6. Upon receiving an IO request issued by the host computer 2, the processor 82 analyzes the received IO request. As a result, the processor 82 identifies a type of the IO request, an LUN (Logical Unit number) corresponding to this IO request, an LBA (Logical Block Address) corresponding to this IO request, and the like. It should be noted that the IO request is either one of a read request and a write request. Moreover, an LUN corresponding to an IO request is an identifier of an LU which has data written to/read from according to this IO request. An LBA corresponding to an IO request is an identifier of an LBA which has data written to/read from according to the IO request.

When an IO request is a read request, the processor 82 determines whether data to which the read request has been issued (read data) is stored in the cache memory 87 based on the information on the directories of the cache memory 87.

When the read data is stored in the cache memory 87, the processor 82 instructs the protocol processor 61 to transfer the read data to the host computer 2.

On the other hand, when the read data is not stored in the cache memory 87, the processor 82 identifies an HDD 51 and an LBA storing the read data. The processor 82 then extracts the read data from the identified LBA of the identified HDD 51. Then, the processor 82 stores the extracted read data in the cache memory 87 and instructs the protocol processor 61 to transfer the read data to the host computer 2.

When the IO request is a write request, the processor 82 determines whether the cache memory 87 stores data of a storage area corresponding to the LBA which corresponds to the I/O request, based on the information on the directories of the cache memory 87.

When the cache memory 87 stores data of the storage area corresponding to the LBA which corresponds to the IO request, the processor 82 instructs the protocol processor 61 to write the data to which the write request has been issued by the host computer 2 (write data) to the storage area on the cache memory 87.

On the other hand, the cache memory 87 does not store data of the storage area corresponding to the LBA which corresponds to the IO request, the processor 82 allocates a storage area in the cache memory 87 to store the write data therein. When a storage area to store the write data cannot be allocated in the cache memory 87, the processor 82 uses the LRU (Least Recently Used) algorithm or the like to determine data to be removed from the cache memory 87. Then, the processor 82 writes back the determined data to the HDD 51 and removes the determined data from the cache memory 87, to thereby allocate a storage area in the cache memory 87 to store the write data therein.

Then, the processor 82 instructs the protocol processor 61 to write the write data in the storage area allocated in the cache memory 87.

It should be noted that the DMA controller 851 provided for the bridge unit 85 can divide an I/O request or combine I/O requests transmitted from the protocol processor 61, according to an instruction from the processor 82. Moreover, the DMA controller 851 provided for the bridge unit 85 can write data in both the cache memories 87 provided for the cluster A801 and the cluster B802, according to an instruction from the processor 82.

A description will now be given of the Fibre Channel protocol.

Figure 3:
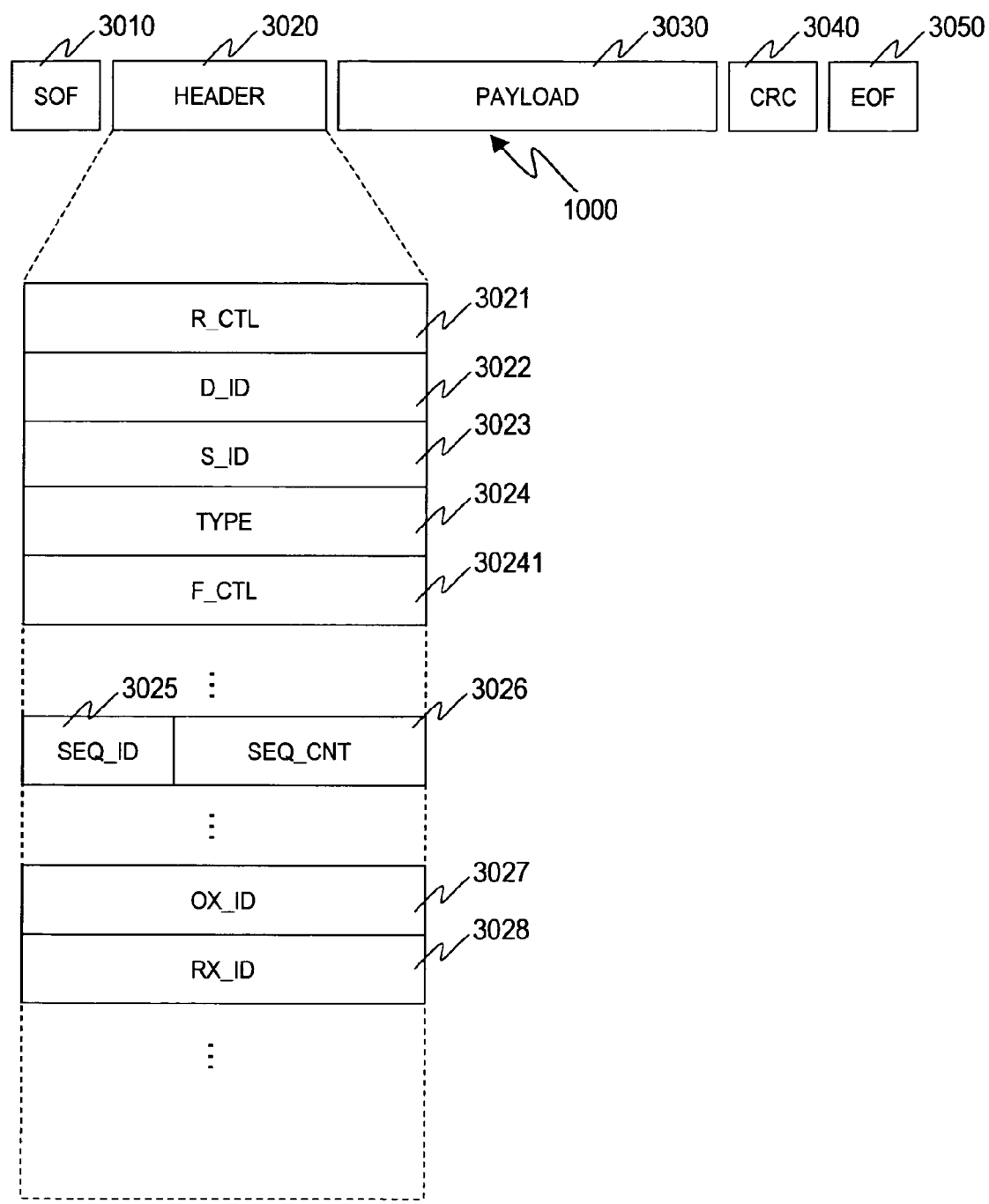
FIG. 3 is an explanatory diagram for describing a frame of the Fibre Channel protocol according to the first embodiment of this invention.

FIG. 3 is an explanatory diagram for describing a frame 1000 of the Fibre Channel protocol according to the first embodiment of this invention.

According to the Fibre Channel protocol, the frame 1000 is used to transmit information. The frame 1000 includes an SOF (Start Of Frame) 3010, a header 3020, a payload 3030, a CRC (Cyclic Redundancy Check) code 3040, and an EOF (End Of Frame) 3050.

The SOF 3010 corresponds to bits indicating a head of the frame 1000. The payload 3030 stores Information Units. A description will be given of the Information Unit with reference to FIGS. 4A to 4D.

The CRC code 3040 corresponds to bits used to detect a transfer error of the frame 1000. The EOF 3050 corresponds to bits indicating a tail of the frame 1000.

The header 3020 includes an R_CTL 3021, a D_ID 3022, an S_ID 3023, a TYPE 3024, an F_CTL 30241, an SEQ_ID 3025, an SEQ_CNT 3026, an OX_ID 3027, and an RX_ID 3028.

The R_CTL 3021 indicates a type of the frame 1000. It should be noted that types of the frame 1000 includes a link control frame and a data frame. The link control frame is used to maintain a link in a normal state, and the data frame is used to transfer data. It should be noted that the frame 1000 according to this embodiment is a data frame.

The D_ID 3022 is a port address of a transmission destination of the frame 1000. The S_ID 3023 is a port address of a transmission source of the frame 1000.

The TYPE 3024 indicates a type of data transmitted by the frame 1000. For example, the TYPE 3024 shows that data of the SCSI-FCP type is transmitted by the frame 1000.

The F_CTL 30241 indicates an attribute of a sequence and an exchange of the frame 1000. For example, the F_CTL 30241 indicates that the frame 1000 is at a top or a tail of a sequence. The F_CTL 30241 also indicates whether a transmission source of the frame 1000 is a request issuing source (originator) or a request receiving source (responder).

The SEQ_ID 3025 is a unique identifier of a sequence corresponding to this frame 1000. The SEQ_CNT 3026 is a position of this frame 1000 in the sequence identified by the SEQ_ID 3025.

The OX_ID 3027 is an exchange ID given by an originator. The RX_ID 3028 is an exchange ID given by a responder. A detailed description will be given of the exchange ID with reference to FIG. 5.

A description will now be given of the Information Units contained in the payload 3030 of the frame 1000. The description will be given of an FCP_CMND 3100, an FCP_XFER_RDY 3200, an FCP_DATA 3300, and an FCP_RSP 3400.

Figure 4A:
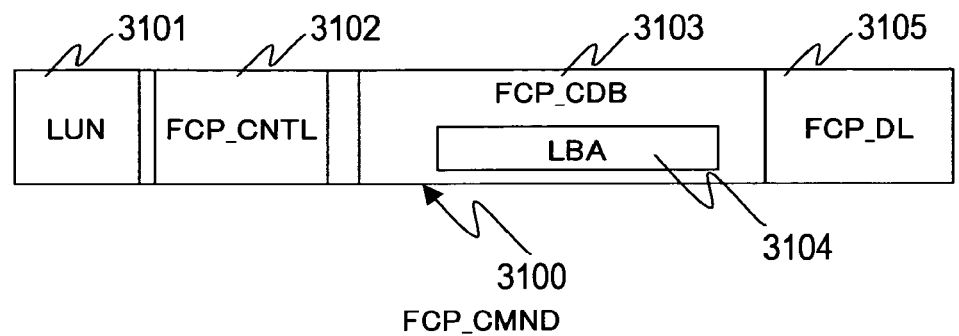
FIG. 4A is an explanatory diagram for describing the Information Units contained in the FCP_CMND according to the first embodiment of this invention.

FIG. 4A is an explanatory diagram for describing the Information Units contained in the FCP_CMND 3100 according to the first embodiment of this invention.

The FCP_CMND 3100 is a frame 1000 relating to an IO request. In this case, the R_CTL 3021 indicates that the frame relates to an I/O request.

The Information Units contained in the FCP_CMND 3100 includes an LUN 3101, an FCP_CNTL 3102, an FCP_CDB 3103, and an FCP_DL 3105.

The LUN (Logical Unit Number) 3101 indicates the logical unit which has access data corresponding to the IO request. The LUN corresponding to an IO request is an LUN which has data written to/read from according to this IO request.

The FCP_CNTL 3102 indicates an attribute of this IO request. An FCP_CDB 3105 stores a SCSI command, an LBA 3104, and the like. The LBA 3104 indicates an LBA corresponding to the IO request.

The FCP_DL 3105 is the maximum transmission length of the data transmitted according to this I/O request. For example, the FCP_DL 3105 stores a size of data written or read according to this IO request.

Figure 4B:
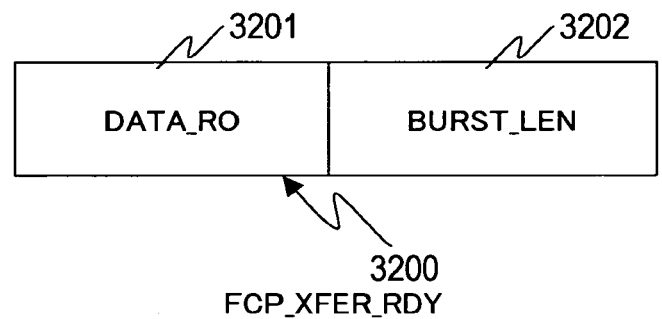
FIG. 4B is an explanatory diagram for describing the Information Units contained in the FCP_XFER_RDY according to the first embodiment of this invention.

FIG. 4B is an explanatory diagram for describing the Information Units contained in the FCP_XFER_RDY 3200 according to the first embodiment of this invention.

The FCP_XFER_RDY 3200 is a frame used to notify the host computer 2 of a completion of preparation to receive write data. In other words, the storage system 1 requests the host computer 2 for a transmission of write data by transmitting the FCP_XFER_RDY 3200 to the host computer 2.

The Information Units contained in the FCP_XFER_RDY 3200 includes a DATA_RO 3201 and a BURST_LEN 3202.

The DATA_RO 3201 is an address offset of the write data requested by this frame. The BURST_LEN 3202 is a burst length of the write data requested by this frame.

Figure 4C:
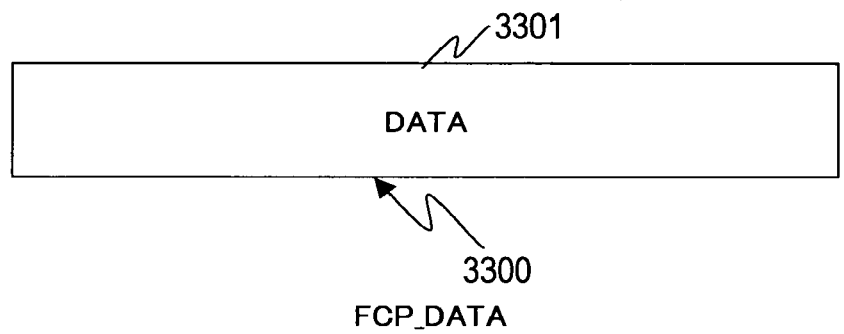
FIG. 4C is an explanatory diagram for describing the Information Units contained in the FCP_DATA according to the first embodiment of this invention.

FIG. 4C is an explanatory diagram for describing the Information Units contained in the FCP_DATA 3300 according to the first embodiment of this invention.

The FCP_DATA 3300 is a frame used to transmit read data or write data.

Information Units contained in the FCP_DATA 3300 include DATA 3301. The DATA 3301 is read data or write data transmitted by this frame.

Figure 4D:
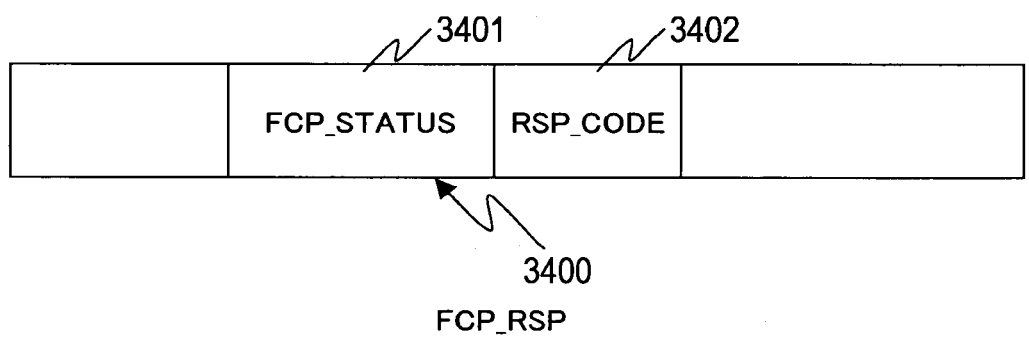
FIG. 4D is an explanatory diagram for describing the Information Units contained in the FCP_RSP according to the first embodiment of this invention.

FIG. 4D is an explanatory diagram for describing the Information Units contained in the FCP_RSP 3400 according to the first embodiment of this invention.

The FCP_RSP 3400 is a frame used to notify a status or sense data.

The Information Units contained in the FCP_RSP 3400 includes an FCP_STATUS 3401 and an RSP_CODE 3402.

The FCP_STATUS 3401 is a status notified by this frame. The RSP_CODE 3402 is a content of an error notified by this frame.

A description will now be given of a process when the host computer 2 transmits a read request to the storage system 1.

Figure 5:
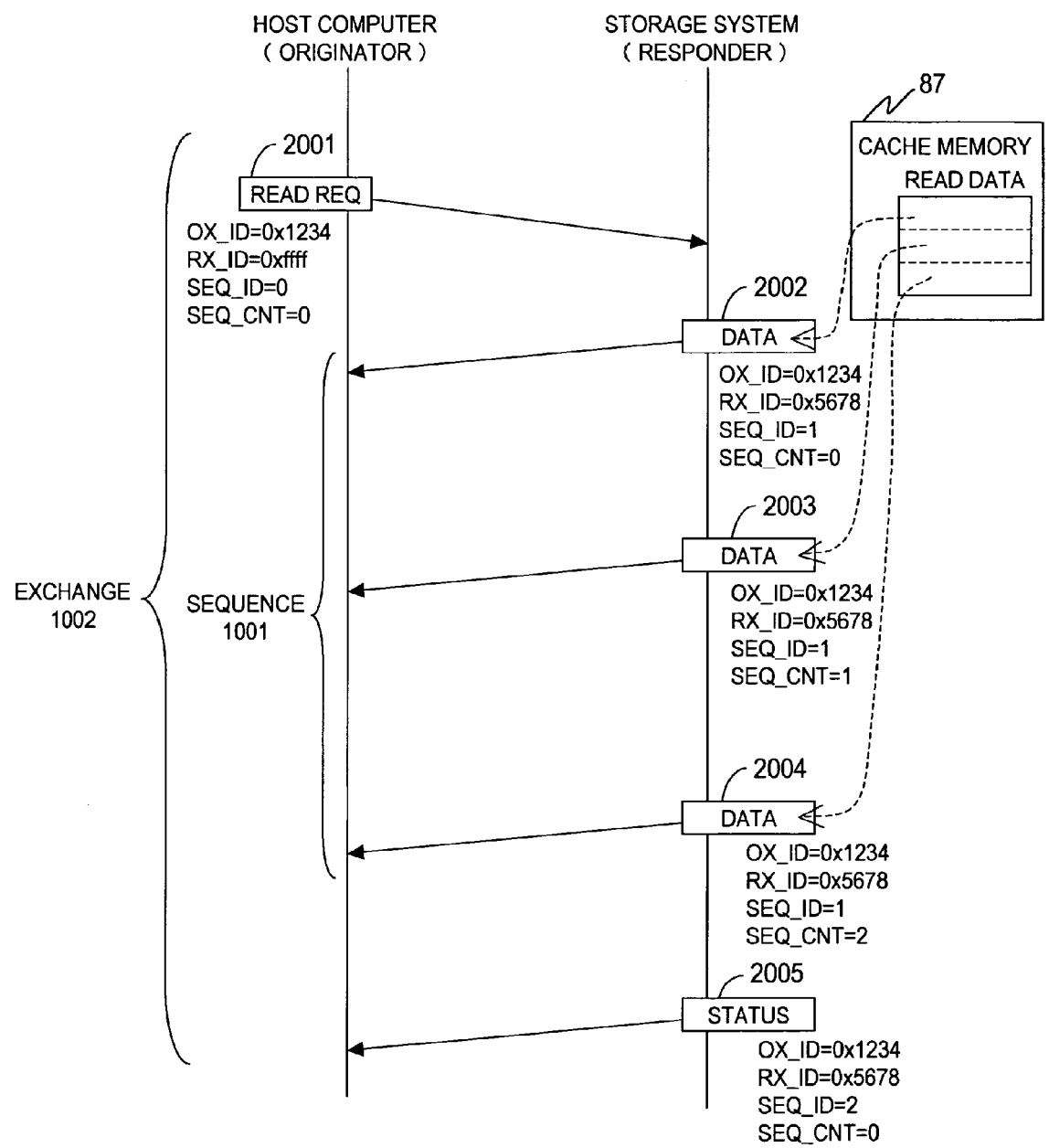
FIG. 5 is a timing chart of a read process of the computer system according to the first embodiment of this invention.

FIG. 5 is a timing chart of a read process of the computer system according to the first embodiment of this invention.

In FIG. 5, the host computer 2 transmits a read request, and is thus an originator. Moreover, the storage system 1 receives the read request, and is thus a responder.

First, the host computer 2 transmits a frame containing the read request 2001 to the storage system 1. The frame containing the read request 2001 is the above-described FCP_CMND 3100.

The storage system 1 receives the frame containing the read request, and determines whether data (read data) to which the read request has been issued by the read request 2001 is stored in the cache memory 87. When the read data is not stored in the cache memory 87, the storage system 1 extracts the read data from the HDD 51. Then, the storage system 1 stores the extracted read data in the cache memory 87.

Then, the storage system 1 transmits the read data stored in the cache memory 87 to the host computer 2.

In FIG. 5, the storage system 1 divides the read data into three pieces of data 2002, 2003, and 2004. Then, the storage system 1 transmits frames each including the data 2002, the data 2003, and the data 2004 to the host computer 2. It should be noted that these frames are FCP_DATA's 3300.

Then, the storage system 1 transmits a frame including a status 2005 to the host computer 2. It should be noted that the status 2005 notifies that the transmitted read data has been correctly received. The frame including the status 2005 is an FCP_RSP 3400.

It should be noted that a process relating to the series of work is a sequence 1001. This chart includes three sequences 1001. A first sequence 1001 is the read request transmission process of the host computer 2. A second sequence 1001 is the read data transmission process of the storage system 2. A third sequence 1001 is the status notification process of the storage system 2. The second sequence 1001 is carried out by means of the three frames. In this way, the sequence 1001 may be carried out by means of a plurality of frames.

Also, a group of processes relating to an IO request issued by the host computer 2 is an exchange 1002. The entire process described in FIG. 5 is an exchange 1002. In other words, the exchange 1002 in FIG. 5 includes three sequences. It should be noted that the exchange 1002 is uniquely identified by an exchange ID.

FIG. 5 shows an OX_ID 3027, an RX_ID 3028, an SEQ_ID 3025, and an SEQ_CNT 3026 included in the frames.

The OX_ID 3027 is an exchange ID given by the host computer 2 serving as an originator. The RX_ID 3028 is an exchange ID given by the storage system 1 serving as a responder. The SEQ_ID 3025 is a unique identifier of the sequence corresponding to the frame. The SEQ_CNT 3026 is a position of the frame in the sequence identified by the SEQ_ID 3025.

According to FIG. 5, the same value "0x1234" is stored in the OX_ID 3027 of all the frames contained in the exchange 1002. Moreover, stored in the RX_ID 3028 of the frame including the read request 2001 is an initial value "0xffff". Then, upon receiving the frame including the read request 2001, the storage system 1 sets the RX_ID 3028 to "0x5678". Then, stored in the RX_ID 3028 of all the frames in the subsequent processes is "0x5678", which is an exchange ID determined by the storage system 1.

Also, stored in the SEQ_CNT 3026 of the frame containing the data 2002 is "0". Stored in the SEQ_CNT 3026 of the frame containing the data 2003 is "1". Stored in the SEQ_CNT 3026 of the frame containing the data 2004 is "2".

A description will now be given of a process when the host computer 2 transmits a write request to the storage system 1.

Figure 6:
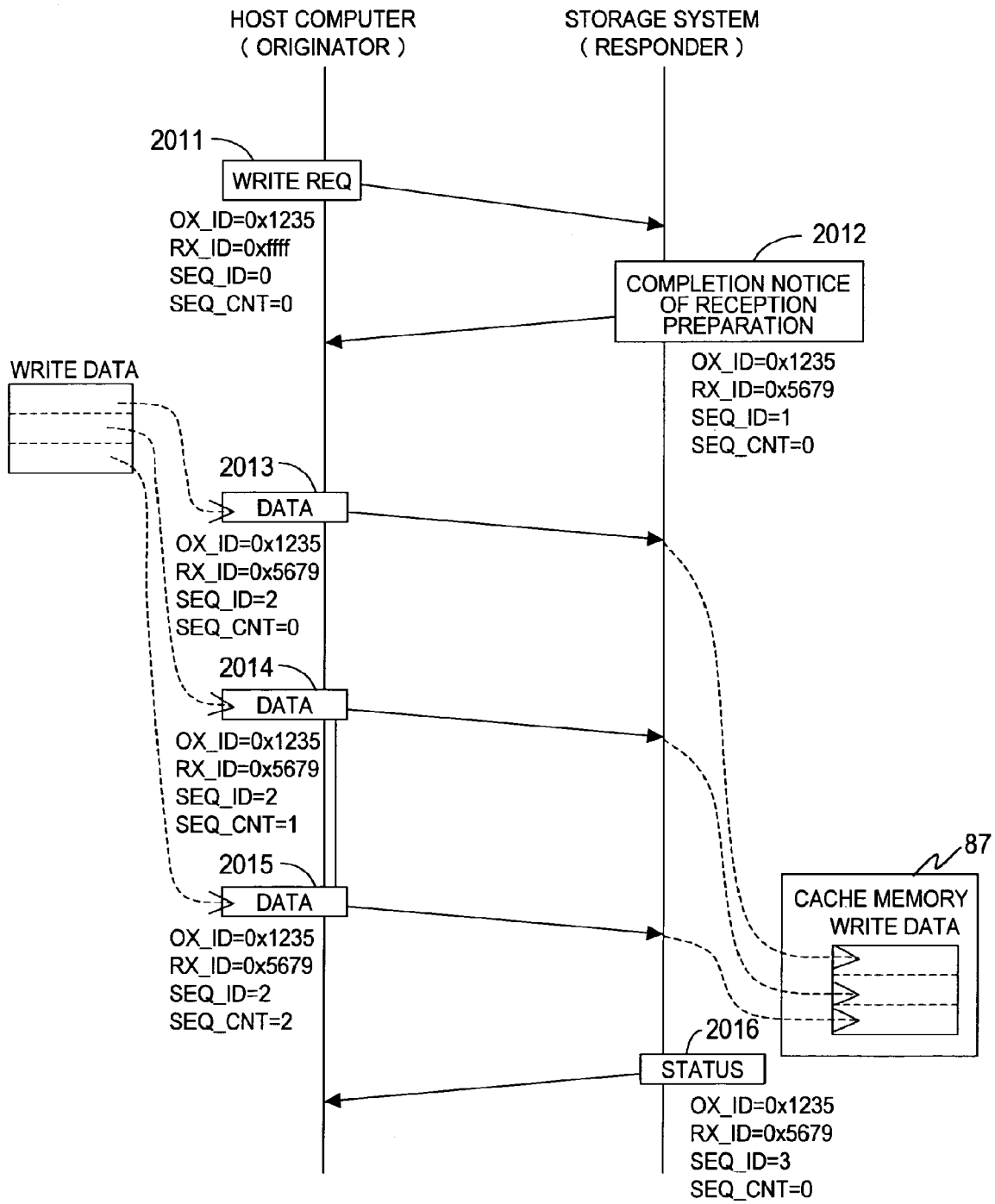
FIG. 6 is a timing chart of a write process of the computer system according to the first embodiment of this invention.

FIG. 6 is a timing chart of a write process of the computer system according to the first embodiment of this invention.

In FIG. 6, the host computer 2 transmits a write request, and is thus an originator. Moreover, the storage system 1 receives the write request, and is thus a responder.

First, the host computer 2 transmits a frame containing the write request 2011 to the storage system 1. The frame containing the write request 2011 is the above-described FCP_CMND 3100.

The storage system 1 receives a frame including the write request 2011. Then, the storage system 1 secures a storage area in the cache memory 87 to store write data therein.

Then, the storage system 1 transmits a frame including a transfer ready message 2012 of completion to prepare to receive the write data to the host computer 2. It should be noted that the frame including the transfer ready message 2012 of completion to prepare to receive the write data is an FCP_XFER_RDY 3200.

The host computer 2 receives the frame including the transfer ready message 2012 of completion to prepare to receive the write data. Then, the host computer 2 transmits the write data to the storage system 1. In FIG. 6, the host computer 2 divides the write data into three pieces of data 2013, 2014, and 2015. Then, the host computer 2 transmits frames each including the data 2013, the data 2014, and the data 2015 to the storage system 1. It should be noted that these frames are FCP_DATA's 3300.

The storage system 1 receives the frames each including the data 2013, the data 2014, and the data 2015. Then, the storage system 1 stores the data 2013, 2014, and 2015 contained in the received frames in the cache memory 87.

Then, the storage system 1 transmits a frame including a status 2016 to the host computer 2. It should be noted that the status 2016 notifies the completion of writing of the transmitted write data. The frame including the status 2016 is an FCP_RSP 3400.

FIG. 6 shows an OX_ID 3027, an RX_ID 3028, an SEQ_ID 3025, and an SEQ_CNT 3026 included in the frames.

According to FIG. 6, the same value "0x1235" is stored in the OX_ID 3027 of all the frames contained in the same exchange. Moreover, stored in the RX_ID 3028 of the frame including the write request 2011 is an initial value "0xffff". Then, upon receiving the frame including the write request 2011, the storage system 1 sets the RX_ID 3028 to "0x5679". Then, the RX_ID 3028 of all the frames in the subsequent processes stores "0x5679", which is a value determined by the storage system 1.

Also, stored in the SEQ_CNT 3026 of the frame containing the data 2013 is "0". Stored in the SEQ_CNT 3026 of the frame containing the data 2014 is "1". Stored in the SEQ_CNT 3026 of the frame containing the data 2015 is "2".

A description will now be given of processes of the protocol processor 61. Here, a description will be given of a process when the host computer 2 transmits a write request to the storage system 1.

Figure 7:
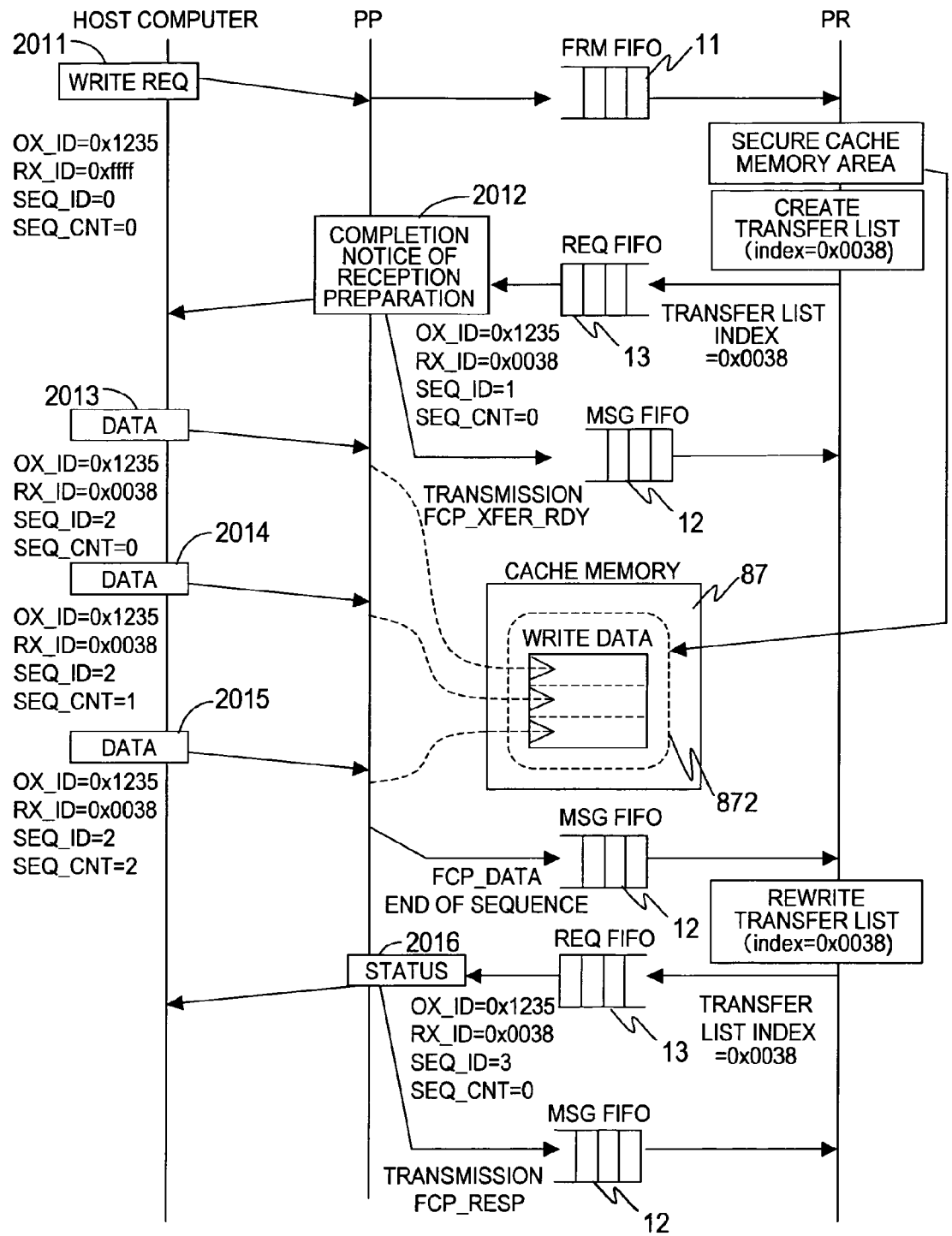
FIG. 7 is a timing chart of a write process of the computer system according to the first embodiment of this invention.

FIG. 7 is a timing chart of a write process of the computer system according to the first embodiment of this invention.

First, the host computer 2 transmits a frame including the write request 2011 to the channel adaptor 6 of the storage system 1.

Then, the protocol processor 61 provided for the channel adaptor 6 receives the frame including the write request 2011. Then, the protocol processor 61 stores the received frame in a frame FIFO 11 via the local router 62. It should be noted that a part of the memory module 84 provided for the storage node 8 is used as the frame FIFO 11.

On the other hand, the processor 82 provided for the storage node 8 extracts the frame from the frame FIFO 11. The processor 82 carries out a process corresponding to the extracted frame. Here, the processor 82 secures a storage area in the cache memory 87 to store the write data therein. Then, the processor 82 creates a transfer list which includes an address of the secured storage area. It should be noted that a detailed description will be given of the transfer list with reference to FIG. 8.

Then, the processor 82 identifies an index of a transfer list pointer corresponding to the created transfer list. The transfer list pointer indicates an address of the storage area storing the transfer list. Then, the processor 82 stores the identified index of the transfer list pointer in the request FIFO 13 via the local router 62. It should be noted that a part of the memory module 63 provided for the storage node 6 is used as the frame FIFO 13.

The protocol processor 61 extracts the index of the transfer list pointer from the request FIFO 13. Then, the protocol processor 61 acquires the transfer list corresponding to the extracted index. Then, the protocol processor 61 transmits a frame including a transfer ready message 2012 of completion to prepare to receive write data to the host computer 2 according to the acquired transfer list. In other words, the protocol processor 61 transmits an FCP_XFER_RDY 3200 to the host computer.

According to the first embodiment, the index of the transfer list pointer is an RX_ID 3028 of the frame. It should be noted that the transfer list may include a field relating an RX_ID 3028 of a frame. In this case, the protocol processor 61 sets the RX_ID contained in the acquired transfer list to an RX_ID 3028 of a frame to be transmitted.

Upon normally transmitting the frame including the transfer ready message 2012 of completion to prepare to receive write data, the protocol processor 61 stores a completion message of a sequence relating to the transmission of the FCP_XFER_RDY 3200 in a message FIFO 12. It should be noted that a part of the memory module 84 provided for the storage node 8 is used as the message FIFO 12.

The processor 82 extracts the completion message of the sequence relating to the transmission of the FCP_XFER_RDY 3200 from the message FIFO 12. The processor 82 confirms that the protocol processor 61 has normally transmitted the FCP_XFER_RDY 3200 based on the extracted message.

On the other hand, the host computer 2 receives the frame including the transfer ready message 2012 of completion to prepare to receive write data. Then, the host computer 2 divides write data into three pieces of data 2013, 2014, and 2015. Then, the host computer 2 transmits frames each including the data 2013, the data 2014, and the data 2015 to the channel adaptor 6 of the storage system 1.

The protocol processor 61 provided for the channel adapter 6 receives the frames each including the data 2013, the data 2014, and the data 2015. Then, the protocol processor 61 stores the data 2013, 2014, and 2015 contained in the received frames in the cache memory 87.

Then, upon receiving all the frames each including the data 2013, the data 2014, and the data 2015, the protocol processor 61 determines that a sequence relating to the reception of the write data has completed. Thus, the protocol processor 61 stores a completion message of the sequence relating to the reception of the write data in the message FIFO 12.

The processor 82 extracts the completion message of the sequence relating to the reception of the write data from the message FIFO 12. The processor 82 determines that the protocol processor 61 has normally received the write data based on the extracted message. Then, the processor 82 determines whether the write data has been normally stored in the cache memory 87 by referring to statuses of the DMA controller 851 and the cache memory 87.

When the write data has been normally stored in the cache memory 87, the processor 82 rewrites the transfer list. It should be noted that the transfer list after the rewrite instructs transmission of a status 2016 to the host computer 2. Also, the status 2016 notifies the completion of writing of the write data.

Then, the processor 82 stores an index of a transfer list pointer corresponding to the rewritten transfer list, in the request FIFO 13.

The protocol processor 61 extracts the index of the transfer list pointer from the request FIFO 13. Then, the protocol processor 61 acquires the transfer list corresponding to the extracted index and transmits a frame including the status 2016 according to the acquired transfer list to the host computer 2. In other words, the protocol processor 61 transmits an FCP_RSP 3400 to the host computer 2.

Upon normally transmitting the frame including the status 2016, the protocol processor 61 stores a completion message of a sequence relating to the transmission of the FCP_RSP 3400 in the message FIFO 12.

The processor 82 extracts the completion message of the sequence relating to the transmission of the FCP_RSP 3400, from the message FIFO 12. The processor 82 determines that the protocol processor 61 has normally transmitted the FCP_RSP 3400 based on the extracted message.

As described above, the storage system 1 stores the write data in the cache memory 87. In other words, the protocol processor 61 and the processor 82 exchange the information by means of the three FIFO's: the frame FIFO 11; the message FIFO 12; and the request FIFO 13.

It should be noted that the protocol processor 61 may stores a frame containing a write request in the message FIFO 11. In this case, the protocol processor 61 uses the fact of being a frame as a type of the message. The processor 82 determines whether information extracted from the message FIFO 12 is a frame or a message based on the type of the message.

Figure 8:
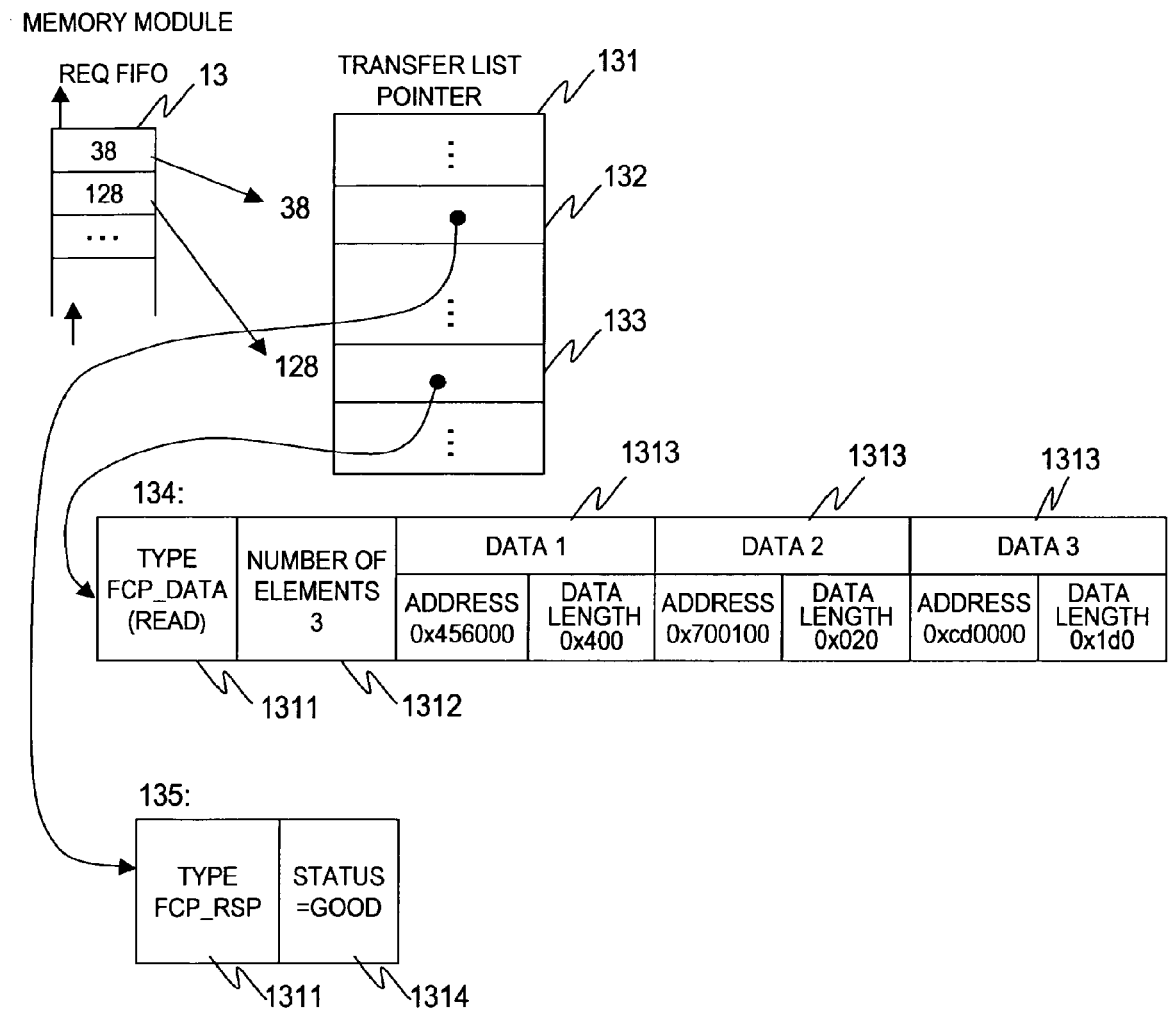
FIG. 8 describes the request FIFO and the transfer list according to the first embodiment of this invention.

FIG. 8 describes the request FIFO 13 and the transfer list according to the first embodiment of this invention.

The request FIFO 13 stores indices of a transfer list pointer 131. The transfer list pointer 131 indicates addresses of storage areas storing transfer lists.

In FIG. 8, stored at a head of the request FIFO 13 is "38", which is an index of the transfer list pointer 131.

Stored in an entry 132 corresponding to the index "38" in the transfer list pointer 131 is an address of a transfer list 135.

The transfer list 135 requests for transmission of an FCP_RSP 3400. Thus, the transfer list 135 contains a type filed 1311 and a status field 1314.

Stored in the type field 1311 is a type of a frame to be transmitted by the protocol processor 61. In other words, the type field 1311 of the transfer list 135 indicates that the frame transmitted by the protocol processor 61 is the FCP_RSP 3400. Stored in the status field 1314 is a status to be included in the frame which is to be transmitted by the protocol processor 61.

Also, stored in the second place of the request FIFO 13 is "128" which is an index of the transfer list pointer 131.

Stored in an entry 133 corresponding to the index "128" in the transfer list pointer 131 is an address of a transfer list 134.

The transfer list 134 requests for transmission of an FCP_XFER_RDY 3200. Thus, the transfer list 134 contains a type filed 1311, an element number field 1312, and data fields 1313.

Stored in the type field 1311 is a type of a frame to be transmitted by the protocol processor 61. In other words, the type field 1311 of the transfer list 134 indicates that the frame to be transmitted by the protocol processor 61 is an FCP_XFER_RDY 3200.

Stored in the element number field 1312 is the number of elements of write data which can be stored in the cache memory 87. In other words, the transfer list 134 includes data fields 1313 the number of which is equal to the value stored in the element number field 1312.

Stored in the data field 1313 is an address of a storage area, in the cache memory 87, to store the write data. Moreover, the data filed 1313 stores a data length of the write data to be stored in the storage area in the cache memory 87.

Figure 9:
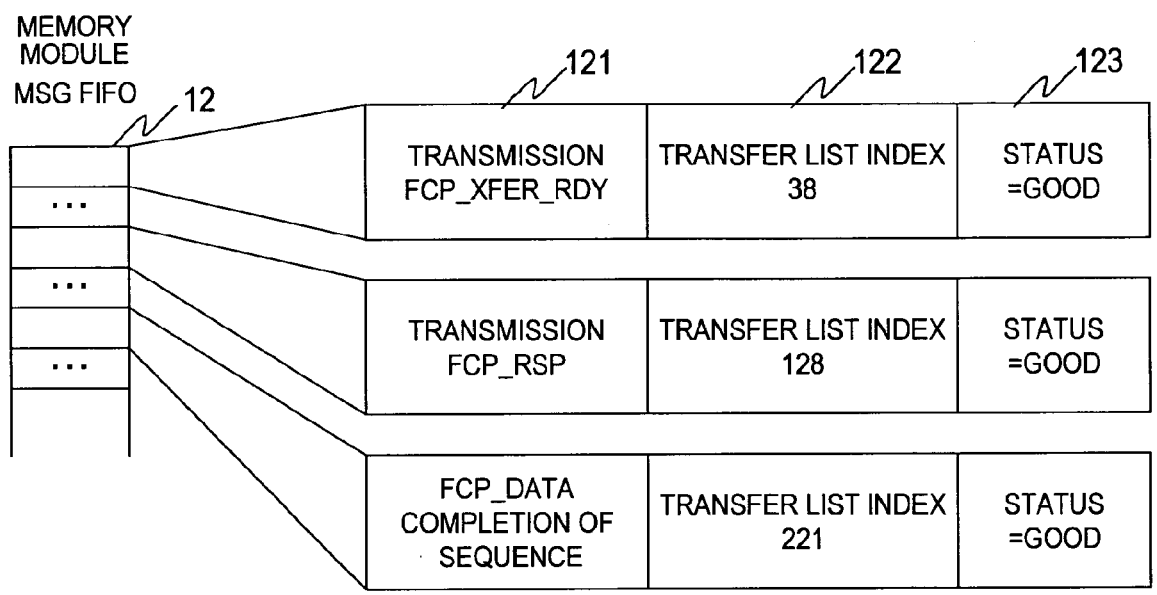
FIG. 9 is an explanatory diagram for describing the message FIFO according to the first embodiment of this invention.

FIG. 9 is an explanatory diagram for describing the message FIFO 12 according to the first embodiment of this invention.

The protocol processor 61 stores a message in the message FIFO 12. A message to be stored in the message FIFO 12 includes a content field 121, a transfer list index field 122, and a status field 123.

Stored in the content field 121 is a type of the message. For example, stored in the content field 121 is a transmission completion notice of an FCP_XFER_RDY 3200, a completion notice of a sequence relating to transmission of an FCP_RSP 3400, or a completion notice of a sequence relating to reception of an FCP_DATA 3300, as the type of the message.

Stored in the transfer list index field 122 is an index of a transfer list corresponding to the message. Stored in the status field 123 is a result of the process stored in the content field 121.

A description will now be given of an implementation of the frame FIFO 11, the message FIFO 12, and the request FIFO 13.

Figure 10:
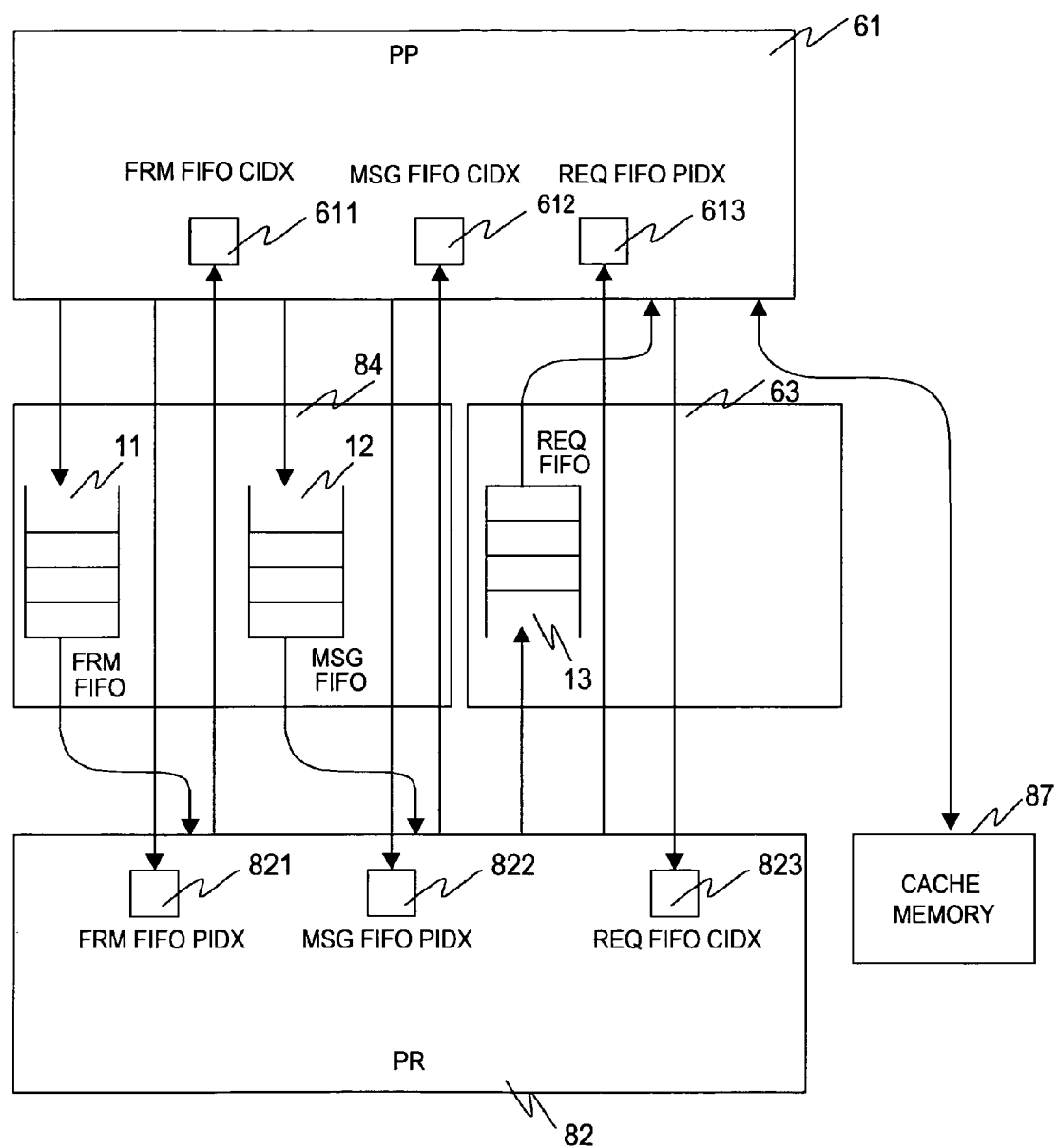
FIG. 10 is an explanatory diagram for describing control of the frame FIFO, the message FIFO, and the request FIFO according to the first embodiment of this invention.

FIG. 10 is an explanatory diagram for describing control of the frame FIFO 11, the message FIFO 12, and the request FIFO 13 according to the first embodiment of this invention.

According to the first embodiment, a producer index and a consumer index are set for each of the frame FIFO 11, the message FIFO 12, and the request FIFO 13.

Here, of the protocol processors 61 or the processors 82, the producer is the one that stores data in a FIFO. On the other hand, of the protocol processors 61 or the processors 82, the consumer is the one that extracts the data from the FIFO. Moreover, the producer index is the index of an entry in the FIFO to which the producer has stored data most recently. Moreover, the consumer index is the index of an entry in the FIFO from which the consumer has extracted data most recently.

In other words, for the frame FIFO 11, the protocol processor 61 is a consumer and the processor 82 is a producer. Thus, the protocol processor 61 manages the consumer index 611 of the frame FIFO. On the other hand, the processor 82 manages the producer index 821 of the frame FIFO.

Further, for the message FIFO 12, the protocol processor 61 is a consumer and the processor 82 is a producer. Thus, the protocol processor 61 manages the consumer index 612 of the message FIFO. On the other hand, the processor 82 manages the producer index 822 of the message FIFO.

Further, for the request FIFO 13, the protocol processor 61 is a producer and the processor 82 is a consumer. Thus, the protocol processor 61 manages the producer index 613 of the request FIFO. On the other hand, the processor 82 manages the consumer index 823 of the request FIFO.

Next, a description will now be given of processes to be performed by the protocol processor 61 and by the processor 82.

Upon storing data in a FIFO, a producer compares a producer index with a consumer index each corresponding to the FIFO. According to the comparison, the producer determines whether there exists a free area in the FIFO to store the data therein. It should be noted that the producer index and the consumer index respectively have a cyclic border.

When there exists a free area in the FIFO and the producer has some request or data for the consumer, the producer increments the producer index. Then, the producer stores the data in an entry corresponding to the incremented producer index in the FIFO.

The consumer compares the consumer index with the producer index. When the consumer index and the producer index are not equal, data is stored in the FIFO. Thus, the consumer extracts data from the FIFO. Then, the consumer increments the consumer index corresponding to the FIFO from which the data has been extracted.

It should be noted that the producer can refer to the consumer index by, for example, recording a copy of the consumer index. Similarly, the consumer can refer to the producer index by, for example, recording a copy of the producer index.

Also, the frame FIFO producer index 821, a message FIFO producer index 822, and a write request FIFO consumer index 823 may be stored in the processor 82, the memory module 84, or the like.

As described above, the protocol processor 61 and the processor 82 exchange data. In a conventional storage system, one protocol processor 61 is controlled by one or a small number of processors 82. Accordingly, in the conventional storage system, even when a large number of processors 82 are provided for the single channel 4, the processors 82 are not efficiently utilized. The storage system 1 of this embodiment has local routers 62, which makes it possible for the plurality of processors 82 in the storage system 1 according to this embodiment to control the single protocol processor 61.

Figure 11:
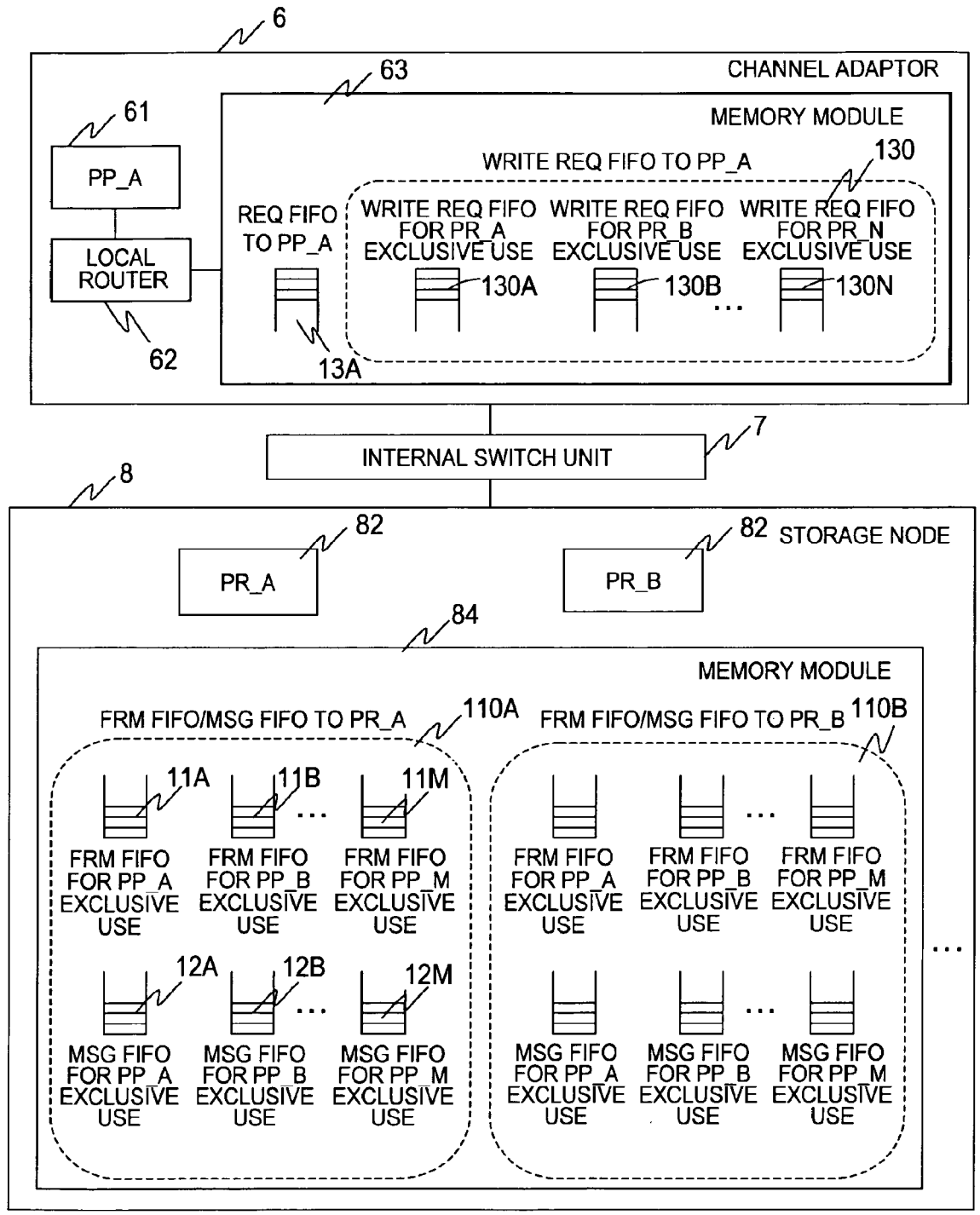
FIG. 11 is an explanatory diagram for describing the frame FIFO, the message FIFO, and the request FIFO according to the first embodiment of this invention.

FIG. 11 is an explanatory diagram for describing the frame FIFO 11, the message FIFO 12, and the request FIFO 13 according to the first embodiment of this invention.

According to the first embodiment, the storage system 1 includes processors A 82 to N 82. Moreover, the storage system 1 includes protocol processors A 61 to M 82. Then, the protocol processor A 61 receives accesses from all the processors 82.

The memory module 84 provided for the storage node 8 stores as many frame/massage FIFO groups 110 to the processors 82 as the processors 82.

The respective frame/message FIFO groups 110 to the processors 82 include the frame FIFO 11 and the message FIFO 12 for each protocol processor 61.

The memory module 63 provided for the channel adaptor 6 stores the request FIFO 13. Moreover, the memory module 63 stores as many write request FIFO's 130 as the processors 82.

The reason for the above is that a process must wait for arrival of data for a read access, while it is not necessary to wait for arrival of data for a write access. The request FIFO 13 is read by the protocol processor 61, and is thus stored in the memory module 63 close to the protocol processor 61. On the other hand, the frame FIFO 11 and the message FIFO 12 are read by the processors 82, and are thus stored in the memory module 84 close to the processors 82. As a result, the performance of the storage system 1 increases.

It should be noted that the request FIFO 13 to the protocol processor may be stored in the local router 62. For example, the request FIFO 13 is stored in a register or the like of the local router 62. In this case, the local router 62 does not have to access the memory module 63, and the process can be further accelerated.

The local router 62 determines which of the processors 82 is responsible for processing a frame to be stored in the frame FIFO 11. The determined processor 82 is called a responsible processor 82. For example, the local router 62 determines a responsible processor 82 based on an exchange ID, access data corresponding to an IO request, an LBA corresponding to the IO request, or S_ID 3023 contained in a frame.

The local router 62 stores a frame in a frame FIFO 11 contained in a frame/message FIFO group 110 to the determined responsible processor 82.

Moreover, the local router 62 determines which of the processors 82 is responsible for processing a message stored in a message FIFO 12. The determined processor 82 is called a responsible processor 82. Then, the local router 62 stores a message in the message FIFO 12 contained in the frame/message FIFO group 110 which is related to the determined responsible processor 82.

Moreover, a processor 82 stores an index of a transfer list in the write request FIFO 130 for this processor 82 exclusive use. For example, the processor 82A stores an index of a transfer list in the write request FIFO 130A for the processor A exclusive use.

Then, the local router 62 extracts indices of transfer lists stored in the respective write request FIFO's 130. Then, the local router 62 stores the extracted indices of the transfer lists in the request FIFO 13 related to the protocol processor.

It should be noted that the local router 62 may store an index of a transfer list, which is to be stored in the write request FIFO 130 by the processor 82, directly in the request FIFO 13 related to the protocol processor.

Therefore, the protocol processor 61 have to process only transfer lists corresponding to indices stored in the request FIFO 13 related to the protocol processor 61. In other words, the protocol processor 61 can process transfer lists issued by a plurality of processors 82 by processing transfer lists corresponding to indices stored in the signal request FIFO 13.

A detailed description will now be given of the local router 62.

Figure 12:
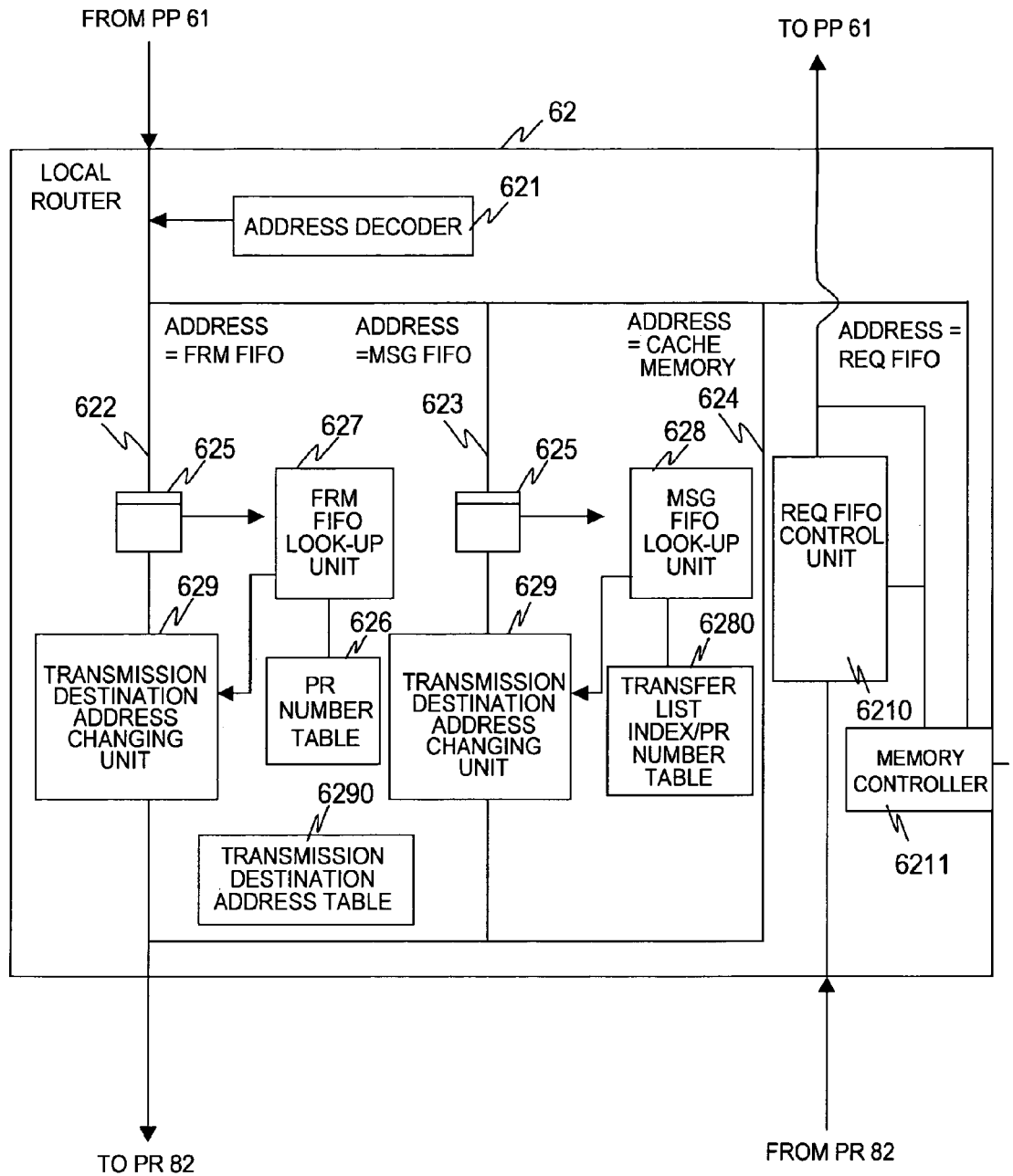
FIG. 12 is a block diagram of a configuration of the local router according to the first embodiment of this invention.

FIG. 12 is a block diagram of a configuration of the local router 62 according to the first embodiment of this invention.

The local router 62 includes an address decoder 621, a buffer 625, a processor number table 626, a frame FIFO look-up unit 627, a message FIFO look-up unit 628, a transmission destination address change unit 629, a transfer list index/processor number table 6280, a transmission destination address table 6290, a request FIFO control unit 6210, and a memory controller 6211.

The address decoder 621 receives an access from the protocol processor 61. It should be noted that the access is a frame, a message, or the like. Then, the address decoder 621 analyzes a transmission destination address of the received access to thereby determine whether the transmission destination of the received access is the cache memory 87, the frame FIFO 11, the message FIFO 12, or the request FIFO 13.

When the transmission destination of the access is the cache memory 87, the address decoder 62 simply transfers the access to the processor 82 (624).

On the other hand, when the transmission destination of the access is the frame FIFO 11, the address decoder 621 stores the access in the buffer 625 (622).

The frame FIFO look-up unit 627 determines which of the processors 82 is responsible for processing the access stored in the buffer 625, based on the processor number table 626. The determined processor 82 is called a responsible processor 82. Then, the frame FIFO look-up unit 627 sets the determined responsible processor 82 as the transfer destination of the access.

The transmission destination address changing unit 629 changes the transmission destination address of the access based on the determined responsible processor 82 and the transmission destination address table 6290.

Then, the transmission destination address changing unit 629 transfers the access, which has a transmission destination address changed, to the processor 82. A detailed description will be given of a process to be performed by the local router 62 when the transmission destination of the access is the frame FIFO 11, with reference to FIG. 16.

On the other hand, when the transmission destination of the access is the message FIFO 12, the address decoder 621 stores the access in the buffer 625 (623).

The message FIFO look-up unit 628 determines which of the processors is a processor 82 that is responsible for processing the access stored in the buffer 625, based on the transfer list index/processor number table 6280. Then, the message FIFO look-up unit 628 sets the determined responsible processor 82 as the transfer destination of the access.

The transmission destination address changing unit 629 changes the transmission destination address of the access based on the determined responsible processor 82 and the transmission destination address table 6290.

Then, the transmission destination address changing unit 629 transfers the access which transmission destination address has been changed to the processor 82. A detailed description will be given of a process by the local router 62 when the transmission destination of the access is the message FIFO 12, with reference to FIG. 17.

On the other hand, the transmission destination of the access is the request FIFO 13, the memory controller 6211 extracts an index of a transfer list from the request FIFO 13 contained in the memory module 63. The request FIFO control unit 6210 transmits the extracted index of the transfer list to the protocol processor 61.

Moreover, the request FIFO control unit 6210 receives an access from the processor 82. Then, the request FIFO control unit 6210 stores an index of a transfer list contained in the received access in the request FIFO 13 contained in the memory module 63.

A detailed description will be given of a process by the local router 62 when the transmission destination of the access is the request FIFO 13, with reference to FIG. 19.

The processor number table 626 indicates a processor (responsible processor) 82 which processes a frame transmitted from the host computer 2. It should be noted that a detailed description will be given of the processor number table 626 with reference to FIG. 13.

The transmission destination address table 6290 indicates an address which is a transfer destination of an access transmitted from the protocol processor 61. It should be noted that a detailed description will be given of the transmission destination address table 6290 with reference to FIG. 14.

The transfer list index/processor number table 6280 indicates a correspondence between an index of a transfer list pointer and a processor number. It should be noted that a detailed description will be given of the transfer list index/processor number table 6280 with reference to FIG. 15.

FIG. 13 is a configuration diagram of the processor number table 626 according to the first embodiment of this invention.

The processor number table 626 includes an input frame 6261 and a processor number 6265.

The input frame 6261 is a content of a frame received by the protocol processor 61. Specifically, the input frame 6261 includes an S_ID 6262, an LUN 6263, and an LBA 6264.

The S_ID 6262 is a port address of the computer 2 which is a transmission source of the frame. Since the processor number table 626 includes the S_ID 6262, the local router 62 can set a logical volume (LU) which can be recognized only by a specific host computer 2.

The LUN 6263 is a unique identifier of a logical volume to which the frame is requesting for the access. The LBA 6264 is a unique identifier of a logical block to which the frame is requesting for the access.

It should be noted that the input frame 6261 may include a logical device number. The logical device number is a unique identifier of a logical device to which the frame is requesting the access.

The processor number 6265 is a unique identifier of a processor which processes a frame corresponding to the S_ID 6262, the LUN 6263, and the LBA 6264 of this entry.

The frame FIFO look-up unit 627 of the local router 62 may look up the processor number 6265 from the processor number table 626 by means of a search algorithm. In this case, the frame FIFO look-up unit 627 of the local router 62 can look up the processor number 6265 fast. It should be noted that the look-up algorithm may be a binary search algorithm, a hash algorithm, or the like. Moreover, some look-up algorithms may require preprocessing such as sorting in an ascending order in the processor number table.

Moreover, the processor number table 626 may be implemented by a CAM (Content Addressable Memory).

As a result, the local router 62 can select a processor 82 which processes a frame according to a volume to which the frame is requesting for an access. Thus, the processor 82 can read and write data without performing exclusive access control over other processors.

Moreover, the local router 62 may assign the same process to a plurality of processors 82 connected to the same peripheral circuitry unit 83. The processors 82 connected to the same peripheral circuitry unit 83 can communicate with one another at a high speed, and, thus, the storage system 1 can efficiently utilize processing capabilities of the processors 82.

FIG. 14 is a configuration diagram of the transmission destination address table 6290 according to the first embodiment of this invention.

The transmission destination address table 6290 includes a processor number 6291, a frame FIFO base address 6292, a message FIFO base address 6293, a frame FIFO producer index 6294, a massage FIFO produce index 6295, a frame FIFO consumer index 6296, and a message FIFO consumer index 6297.

The processor number 6291 is a unique identifier of a processor 82 provided for the storage node 8.

The frame FIFO base address 6292 is a head address of a frame FIFO 11 related to the processor 82 identified by the processor number 6291 in this entry. The message FIFO base address 6293 is a head address of a message FIFO 12 related to the processor 82 identified by the processor number 6291 in this entry.

The frame FIFO producer index 6294 is an index of an entry, in which data has been stored most recently, of the frame FIFO 11 related to the processor 82 identified by the processor number 6291 in this entry.

The message FIFO producer index 6295 is an index of an entry, in which data has been stored most recently, of the message FIFO 12 related to the processor 82 identified by the processor number 6291 in this entry.

The frame FIFO consumer index 6296 is an index of an entry, from which data has been extracted most recently, of the frame FIFO 11 related to the processor 82 identified by the processor number 6291 in this entry.

The frame FIFO consumer index 6297 is an index of an entry, from which data has been extracted most recently, of the message FIFO 12 related to the processor 82 identified by the processor number 6291 in this entry.

FIG. 15 is a configuration diagram of the transfer list index/processor number table 6280 according to the first embodiment of this invention.

The transfer list index/processor number table 6280 includes a transfer list index 6281, a Valid 6282, a processor number 6283, and an index for processor 6284.

The transfer list index 6281 is an index of a transfer list pointer. The Valid 6282 indicates whether this entry is valid or not. Specifically, when this entry is valid, "true" is stored in the Valid 6282. On the other hand, when this entry is invalid, "false" is stored in the Valid 6282.

The processor number 6283 is a unique identifier of a processor 82 which processes a transfer list corresponding to the transfer list index 6281 of this entry. The index for processor 6284 is an index of a transfer list pointer used by the processor 82 identified by the processor number 6283 of this entry.

Figure 16:
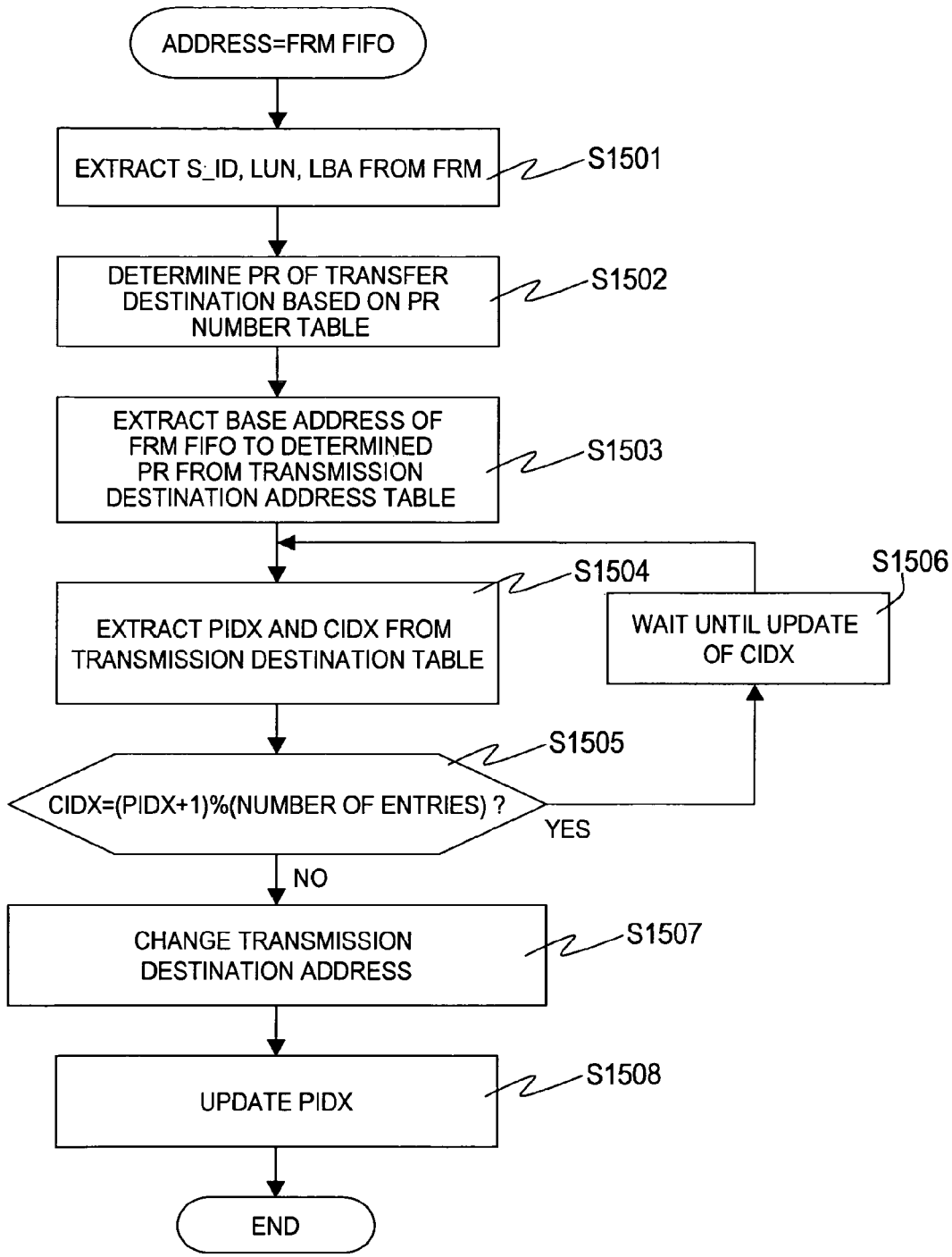
FIG. 16 is a flowchart of a process by the local router which has received an access addressed to the frame FIFO according to the first embodiment of this invention.

FIG. 16 is a flowchart of a process by the local router 62 which has received an access addressed to the frame FIFO 11 according to the first embodiment of this invention.

First, the local router 62 receives the access addressed to the frame FIFO 11. This access is a frame. The local router 62 extracts an S_ID, an LUN corresponding to an IO request, and an LBA corresponding to the IO request, from the received frame (S1501).

Then, the local router 62 determines a processor 82 which is to be a transfer destination of the frame, based on the processor number table 626 (S1502).

Specifically, the local router 62 selects entries whose S_ID 6262 in the processor number table 626 matches the extracted S_ID, from the processor number table 626. Then, the local router 62 selects entries whose LUN 6263 in the processor number table 626 matches the extracted LUN, from among the selected entries. Further, the local router 62 selects an entry whose LBA in the processor number table 626 includes the extracted LBA, from among the selected entries.

Then, the local router 62 extracts a processor number 6265 from the selected entry. Then, the local router 62 determines a processor 82 identified by the extracted processor number 6265 as the transfer destination of the frame.

It should be noted that there has been described the method of the sequential selection according to the first embodiment. The local router 62 may consider the S_ID, the LUN, and the LBA as a consecutive key, and may use the key in the binary search algorithm or a hash algorithm. Moreover, the local router 62 may use a memory which provides a look-up function. The memory providing the look-up function includes a CAM (Content Addressable Memory).

Then, the local router 62 identifies a base address of the frame FIFO 11 related to the processor 82 which is the transfer destination, based on the transmission destination address table 6290.

Specifically, the local router 62 selects an entry whose processor number 6291 matches the extracted processor number 6265 from the transmission destination address table 6290.

Then, the local router 62 extracts a frame FIFO base address 6292 from the selected entry (S1503). Further, the local router 62 extracts a frame FIFO producer index 6294 and a frame FIFO consumer index 6296 from the selected entry (S1504).

Then, the local router 62 adds "1" to the extracted frame FIFO producer index 6294. Then, the local router 62 acquires a remainder obtained by dividing the frame FIFO producer index 6294 incremented by the number of entries contained in the frame FIFO 11. Then, the local router 62 compares the obtained remainder with the extracted frame FIFO consumer index 6296 (S1505).

When the remainder and the frame FIFO consumer index 6296 are equal to each other, the frame FIFO 11 does not have a free space. Then, the local router 62 waits for an update of the extracted frame FIFO consumer index 6294 (S1506). When the frame FIFO consumer index 6294 is updated, the local router 62 returns to the step S1504.

On the other hand, when the remainder and consumer index 6296 are different from each other, there is a free space in the frame FIFO 11. Then, the local router 62 calculates a transmission destination address of the frame.

Specifically, the local router 62 calculates the transmission destination address according to the following equation (1).

(Transmission destination address)=(Frame FIFO base address 6292)+(Frame FIFO producer index 6294 incremented by "1")×(Size of one entry of frame FIFO 11)–(1)

The local router 62 changes the transmission destination address contained in the frame to the calculated transmission destination address (S1507). Then, the local router 62 transmits the frame whose transmission destination address has been changed to the internal switch unit 7.

Then, the local router 62 updates the frame FIFO producer index 6294 contained in the transmission destination address table 6290 (S1508).

Specifically, the local router 62 adds "1" to the extracted frame FIFO producer index 6294. Then, the local router 62 acquires a remainder by dividing the frame FIFO producer index 6294 incremented by the number of entries contained in the frame FIFO 11. Then, the local router 62 stores the obtained remainder in the producer index 6294 of the frame FIFO of the transmission destination address table 6290.

Then, the local router 62 completes this process.

Figure 17:
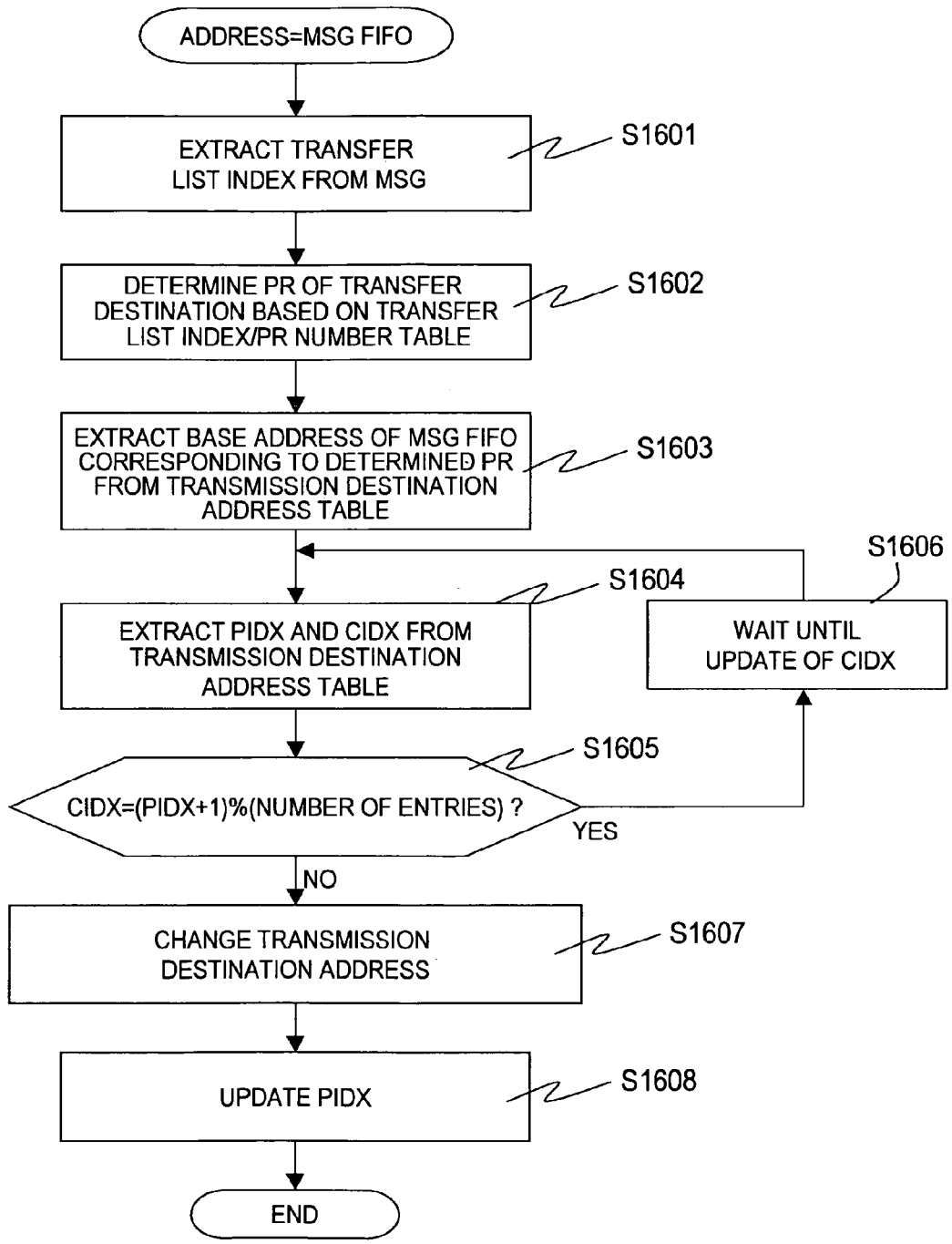
FIG. 17 is a flowchart of a process by the local router upon receiving an access addressed to the message FIFO according to the first embodiment of this invention.

FIG. 17 is a flowchart of a process by the local router 62 upon receiving an access addressed to the message FIFO 12 according to the first embodiment of this invention.

First, the local router 62 receives the access addressed to the message FIFO 12. This access is a message. The local router 62 extracts a transfer list index from the received message (S1601).

Then, the local router 62 determines a processor 82 which is a transfer destination of this message based on the transfer list index/processor number table 6280 (S1602). It should be noted that a detailed description will be given of the processing in the step S1602 with reference to FIG. 18.

For example, the local router 62 selects an entry whose transfer list index 6281 matches the extracted transfer list index, from the transfer list index/processor number table 6280.

Then, the local router 62 extracts a processor number 6283 and an index for processor 6284 from the selected entry. Then, the local router 62 changes the transfer list index contained in the message to the extracted index for processor 6284. Moreover, the local router 62 determines a processor 82 identified by the extracted processor number 6283 as the transfer destination of the message.

Then, the local router 62 identifies a base address of the message FIFO 12 to the processor 82 which is the transfer destination based on the transmission destination address table 6290.

Specifically, the local router 62 selects an entry whose processor number 6291 matches the extracted processor number 6283 from the transmission destination address table 6290.

Then, the local router 62 extracts a message FIFO base address 6293 from the selected entry (S1603). Further, the local router 62 extracts a message FIFO producer index 6295 and a message FIFO consumer index 6297 from the selected entry (S1604).

Then, the local router 62 adds "1" to the extracted message FIFO producer index 6295. Then, the local router 62 acquires a remainder obtained by dividing the message FIFO producer index 6295 incremented by the number of entries contained in the message FIFO 12. Then, the local router 62 compares the obtained remainder with the extracted message FIFO consumer index 6297 (S1605).

When the remainder and the message FIFO consumer index 6297 are equal to each other, the message FIFO 12 does not have a free space. Then, the local router 62 waits for an update of the extracted message FIFO consumer index 6295 (S1606). When the message FIFO consumer index 6295 is updated, the local router 62 returns to the step S1604.

On the other hand, when the remainder and consumer index 6297 of the message FIFO are different from each other, there is a free space in the message FIFO 12. Then, the local router 62 calculates a transmission destination address of the message.

Specifically, the local router 62 calculates the transmission destination address according to the following equation (2).

(Transmission destination address)=(Message FIFO base address 6293)+(Message FIFO producer index 6295 incremented by "1")×(Size of one entry of message FIFO 12)–(2)

The local router 62 changes the transmission destination address contained in the message to the calculated transmission destination address (S1607). Then, the local router 62 transmits the message whose transmission destination address has been changed to the internal switch unit 7.

Then, the local router 62 updates the message FIFO producer index 6295 contained in the transmission destination address table 6290 (S1608).

Specifically, the local router 62 adds "1" to the extracted message FIFO producer index 6295. Then, the local router 62 acquires a remainder by dividing the message FIFO producer index 6295 incremented by the number of entries in the message FIFO 12. Then, the local router 62 stores the obtained remainder in the producer index 6295 of the message FIFO.

Then, the local router 62 completes this process.

Figure 18:
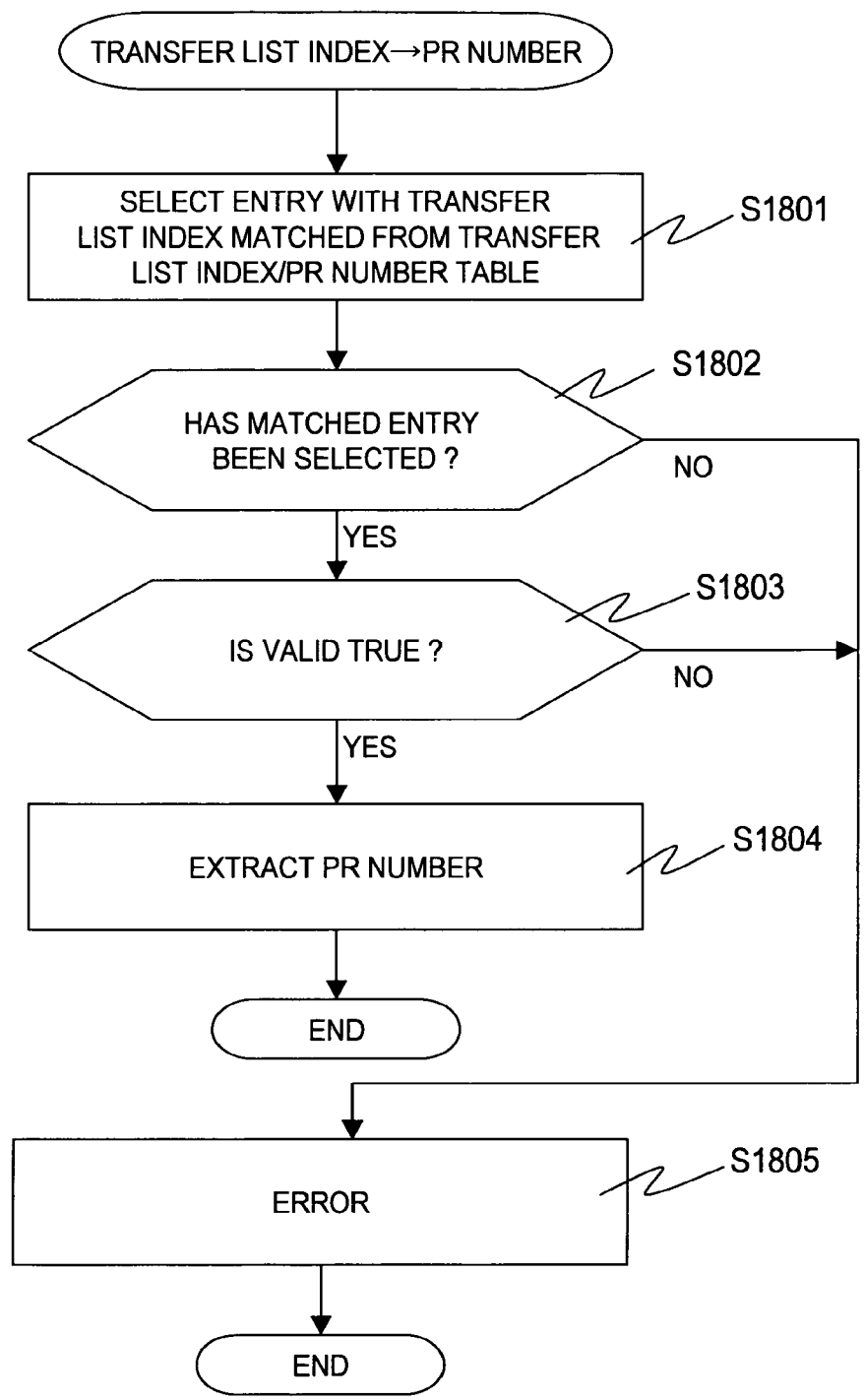
FIG. 18 is a flowchart of a process of the local router according to the first embodiment of this invention in order to determine a responsible processor.

FIG. 18 is a flowchart of a process of the local router 62 according to the first embodiment of this invention in order to determine a responsible processor 82.

The process to determine the responsible processor 82 is carried out in the step S1602 by the process of the local router shown in FIG. 17.

First, the local router 62 selects an entry whose transfer list index 6281 matches the transfer list index extracted in the step S1601 of the process by the local router shown in FIG. 17 from the transfer list index/processor number table 6280 (S1801).

Then, the local router 62 determines whether or not an entry whose transfer list index matches has been selected in the step S1801 (S1802).

When an entry whose transfer list index matches has not been selected, the local router 62 notifies the processor 82 and the like of the error (S1805).

On the other hand, when an entry whose transfer list index matches has been selected, the local router 62 extracts a Valid 6282 from the selected entry. Then, the local router 62 determines whether the extracted Valid 6282 is "true" or "false" (S1803).

When the Valid 6282 is "false", the local router 62 notifies the processor 82 and the like of the error (S1805).

On the other hand, when the Valid 6282 is "true", the local router 62 extracts a processor number 6283 from the selected entry. Then, the local router 62 determines a processor 82 identified by the extracted processor number 6283 as the transfer destination of the message. Then, the local router 62 completes this process.

A description will now be given of an update process of the transfer list index/processor number table 6280.

Figure 19:
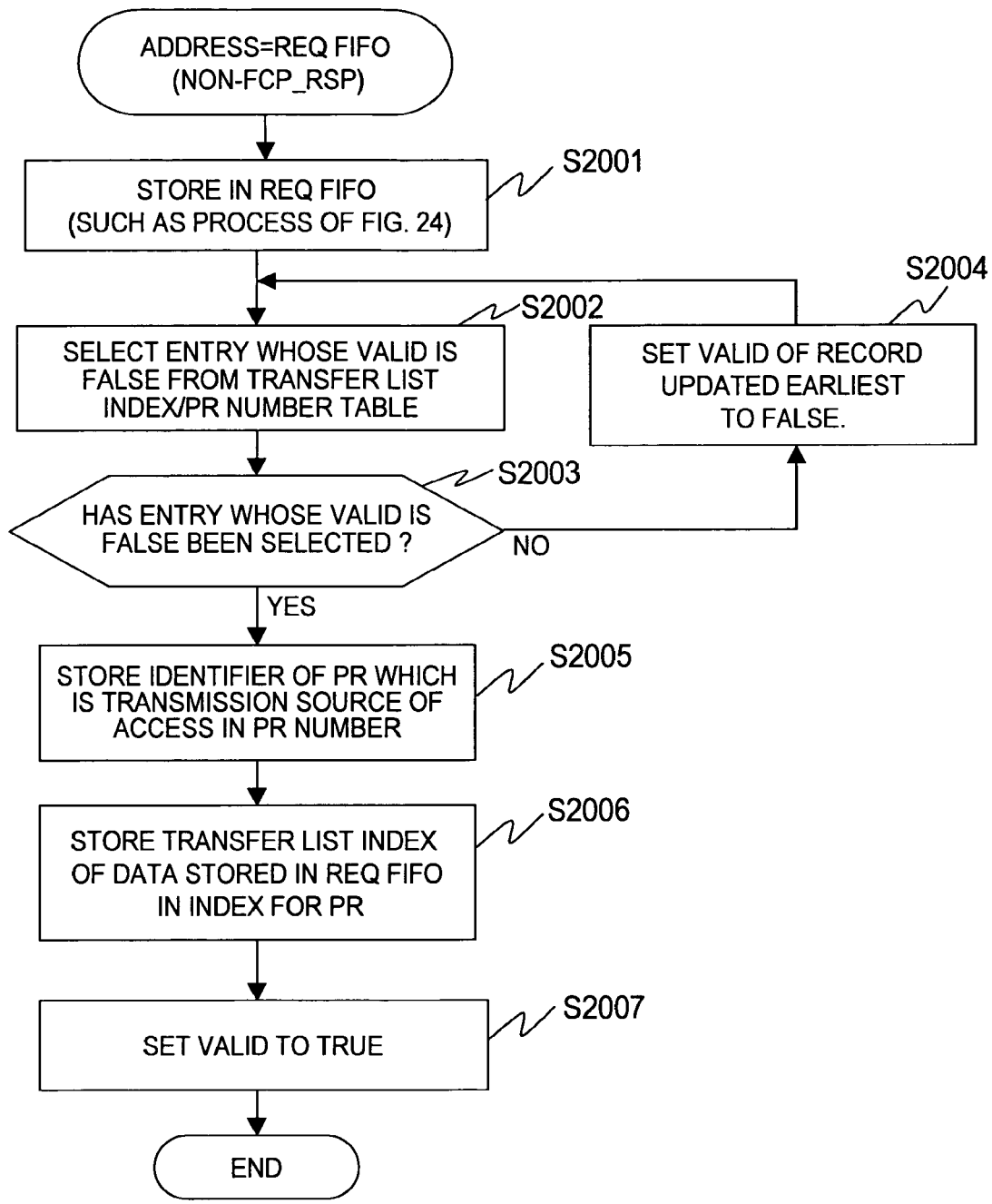
FIG. 19 is a flowchart of the update process by the transfer list index/processor number table according to the first embodiment of this invention.

FIG. 19 is a flowchart of the update process by the transfer list index/processor number table 6280 according to the first embodiment of this invention.

The local router 62 receives an access addressed to the write request FIFO 13 from the processor 82. It should be noted that this access is not a transmission request of an FCP_RSP.

Upon receiving the access addressed to the write request FIFO 130, the local router 62 stores a transfer list index corresponding to this access in the request FIFO 13 (S2001). It should be noted that the process to store the transfer list index in the request FIFO 13 is detailed with reference to FIG. 24. Moreover, the request FIFO 13 is recognized by the protocol processor 61. On the other hand, the write request FIFO 130 is recognized by the processor 82.

Then, the local router 62 selects an entry whose Valid 6282 contains "false" from the transfer list index/processor number table 6280 (S2002).

It should be noted that the local router 62 may select an entry whose transfer list index 6281 matches an OX_ID of a frame whose transmission is requested by this transfer list from the transfer list index/processor number table 6280 in the step S2002.

Then, the local router 62 determines whether or not an entry has been selected in the step S2002 (S2003).

When an entry has not been selected, the local router 62 selects an entry which has been updated least recently. For example, the local router 62 selects the entry updated least recently by means of the LRU algorithm or the like. Then, the local router 62 stores "false" in the Valid 6282 of the selected entry (S2004). Then, the local router 62 returns to the step S2002.

On the other hand, when an entry has been selected, the local router 62 stores an identification of a processor 82 which is a transmission source of the received access into a processor number 6283 of the selected entry (S2005).

Then, the local router 62 stores a transfer list index stored in a write request FIFO 130 into an index for processor 6284 of the selected entry (S2006). Then, the local router 62 stores "true" in a Valid 6282 of the selected entry (S2007).

Then, the local router 62 completes this process.

It should be noted that the local router 62 has changed the Valid 6282 of the transfer list index/processor number table 6280 to "false" in the step S2004. However, the processor 82 may change the Valid 6282 of the transfer list index/processor number table 6280 to "false". Moreover, when the protocol processor 61 has completed the process of the transfer list corresponding to the transfer list index, the local router 62 may change a Valid 6282 of an entry corresponding to the processed transfer list to "false".

It should be noted that the local router 62 may manage the transfer list index in a different way.

Figure 20:
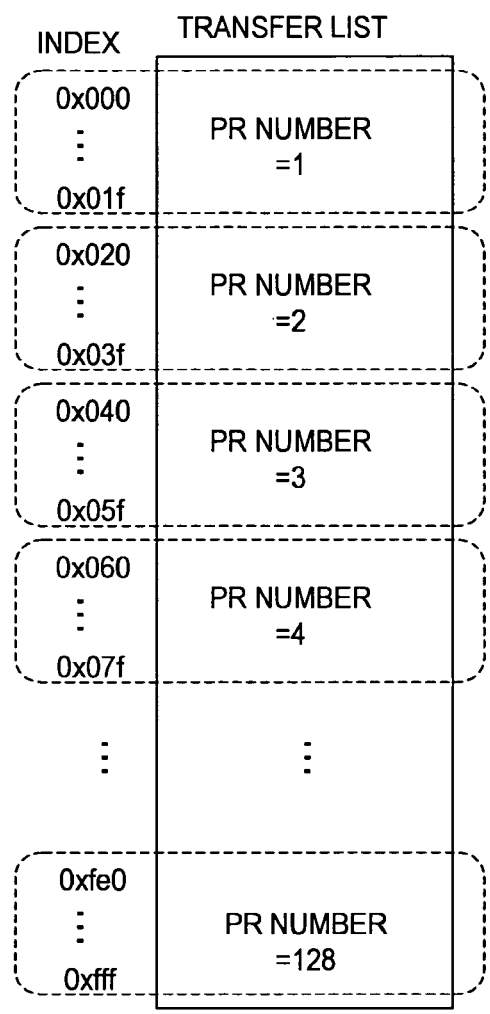
FIG. 20 describes the management of the transfer list index according to the first embodiment of this invention.

FIG. 20 describes the management of the transfer list index according to the first embodiment of this invention.

In FIG. 20, the transfer list indices are divided into a plurality of sections. The respective sections are used only by a specific processor 82. For example, transfer list indices contained in "0x000-0x01f" are used only by a processor 82 identified by a processor number "1". Similarly, transfer list indices contained in "0x020-0x03f" are used only by a processor 82 identified by a processor number "2".

In this case, the local router 62 can easily identify a processor corresponding to a transfer list index. As a result, the local router 62 does not have to carry out the update process shown in FIG. 19 of the transfer list index/processor number table 6280.

When it is not possible to set restriction or the like on a processor 82 which uses transfer list indices, the local router 62 is provided with an exchange ID/processor number list. Moreover, according to this embodiment, though the message FIFO 12 contains transfer list indices, even when a protocol processor 61 is used without this configuration, the local router 62 is provided with an exchange ID/processor number list.

Figure 21:
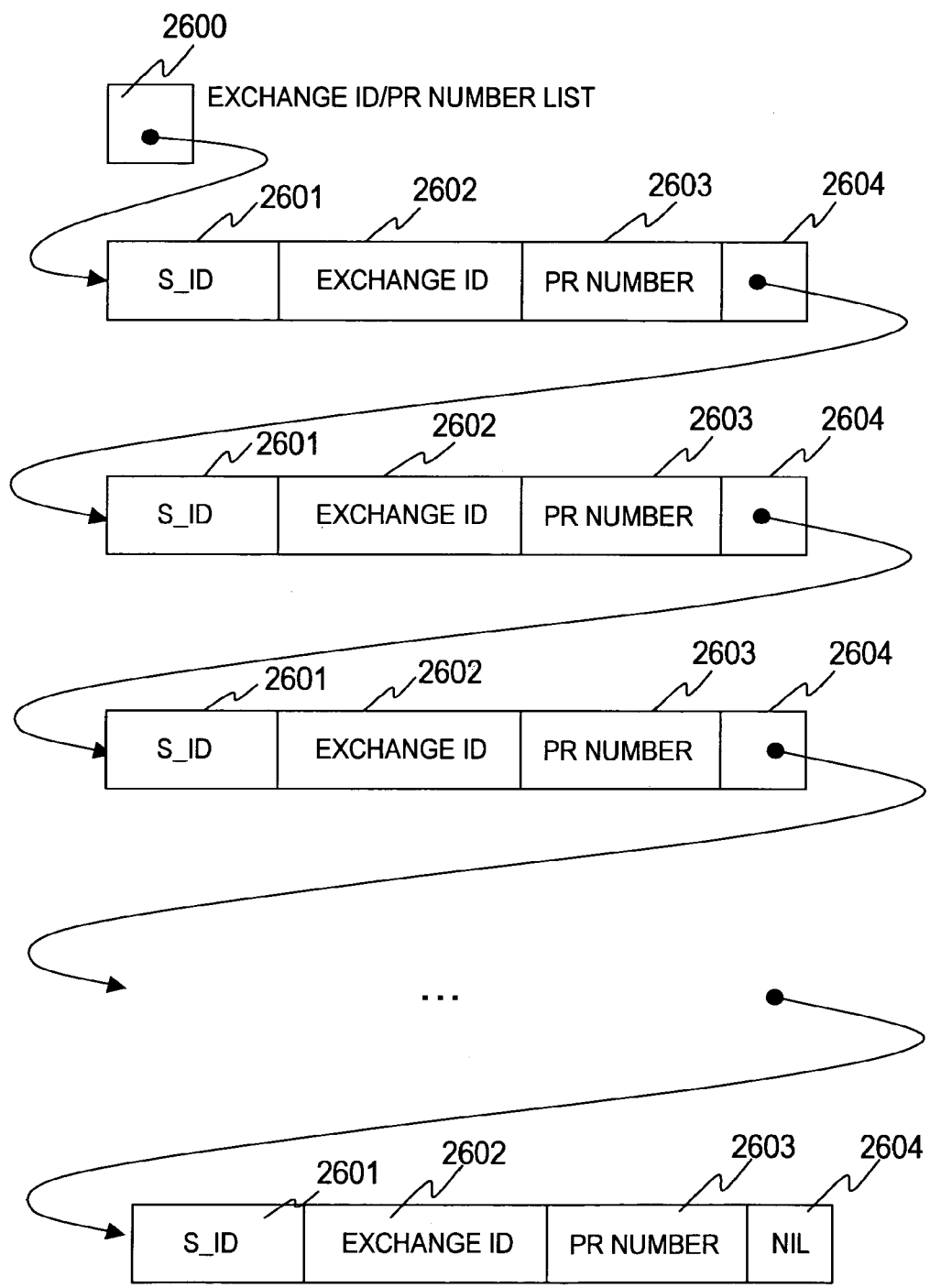
FIG. 21 describes the exchange ID/processor number list according to the first embodiment of this invention.

FIG. 21 describes the exchange ID/processor number list 2600 according to the first embodiment of this invention.

The exchange ID/processor number list 2600 stores data having a list structure. Moreover, the exchange ID/processor number list 2600 includes S_ID fields 2601, exchange ID fields 2602, processor number fields 2603, and next pointer fields 2604.

Stored in the S_ID field 2601 is an S_ID contained in a frame. It should be noted that an S_ID is a port address of a transmission source of the frame. Stored in the exchange ID field 2602 is an OX_ID contained in the frame. The OX_ID is an exchange ID added by an originator. Stored in the processor number field 2603 is a unique identifier of a processor which is to process a frame corresponding to the S_ID field 2601 and the exchange ID field 2602. The next pointer field 2604 indicates a position of a next list.

On receiving an access whose transmission destination is a frame FIFO 11 from a protocol processor 61, the local router 62 carries out the process described with reference to FIG. 16. It should be noted that this access is a frame.

In this case, the local router 62 adds a new list to the exchange ID/processor number list 2600 after the step S1502.

Then, the local router 62 extracts an S_ID and an OX_ID from the received frame. Then, the local router 62 stores the extracted S_ID in an S_ID field 2601 of a new list. Then, the local router 62 stores the extracted OX_ID in an exchange ID field 2602 of the new list.

Then, the local router 62 determines a processor 82 which is a transfer destination of the received frame based on the processor number table 626. Then, the local router 62 stores an identifier of the determined processor 82 in a processor number 2603 of the new list.

Then, the local router 62 carries out the process subsequent to the step S1503.

Then, on receiving an access whose transmission destination is the message FIFO 12 from the protocol processor 61, the local router 62 carries out the process described with reference to FIG. 17. It should be noted that the local router 62 carries out the following process in place of the step S1602. It should be noted that this access is a message.

The local router 62 extracts an S_ID and an exchange ID from the received message. Then, the local router 62 traverses the exchange ID/processor number list 2600 from the head. Then, the local router 62 selects a list whose S_ID field 2601 matches the extracted S_ID, and whose exchange field ID 2603 matches the extracted exchange ID from the exchange ID/processor number list 2600.

Then, the local router 62 extracts an identifier of a processor 82 from a processor number filed 2603 of the selected list. Then, the local router 62 determines the processor 82 identified by the extracted processor identifier as the transfer destination of the message. Then, on a completion of the exchange corresponding to the received message, the local router 62 deletes the selected list.

Figure 22:
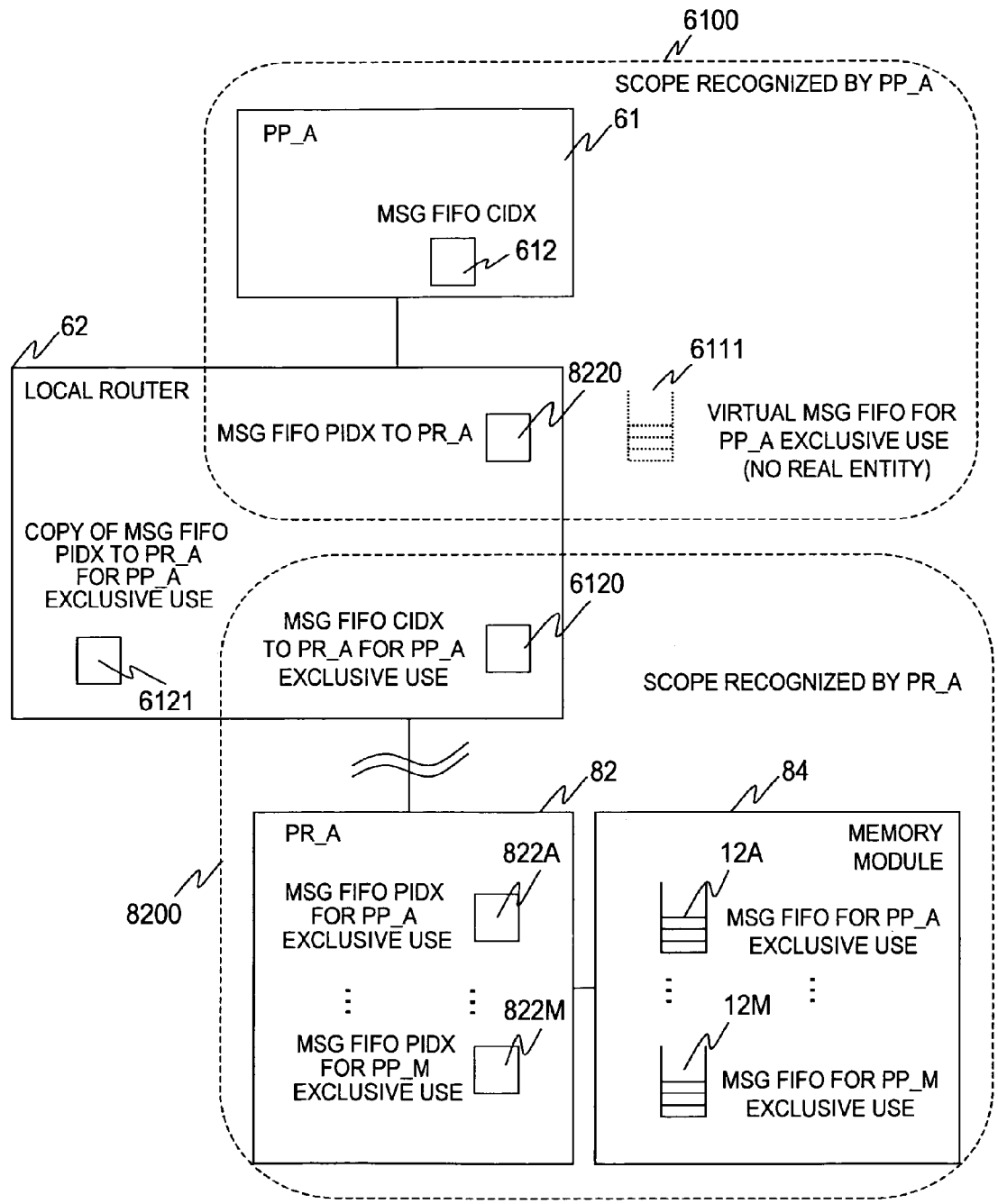
FIG. 22 describes virtualization of a message FIFO according to the first embodiment of this invention.

FIG. 22 describes virtualization of a message FIFO according to the first embodiment of this invention.

FIG. 22 shows a recognition scope 6100 of a protocol processor A61 and a recognition scope 8200 of a processor A82.

The local router 62 provides the protocol processor 61 with a virtual message FIFO 6111 for the protocol processor exclusive use. It should be noted that the virtual message FIFO 6111 for the protocol processor exclusive use is a virtual FIFO, whose actual entity does not exist.

The protocol processor 61 transmits a message to the virtual message FIFO 6111 for the protocol processor A exclusive use. Then, the local router 62 stores the message in a message FIFO 12A for the protocol processor A exclusive use by changing a transmission destination of the message. It should be noted that the message FIFO 12A for the protocol processor A exclusive use is contained in the memory module 84.

Then, the protocol processor 61 increments a message FIFO producer index 8220 to the processor A.

It should be noted that the local router 62 is provided with a copy 6121 of a message FIFO producer index to the processor A for the protocol processor A exclusive use in addition to a message FIFO producer index 8220 to the processor A.

When the message FIFO producer index 8220 to the processor A is updated, the local router 62 increments a message FIFO producer index 822A for the protocol processor A exclusive use by means of the copy 6121 of the message FIFO producer index to the processor A for the protocol processor A exclusive use. It should be noted that a message FIFO producer index 822 for the protocol processor exclusive use is provided for a processor 82.

In this way, the protocol processor 61 notifies the processor 82 of the transmission of the message.

Then, the processor A 82 extracts the message from the message FIFO 12A for the protocol processor A exclusive use. Then, the processor A 82 increments a message FIFO consumer index 6120 to the processor A for the protocol processor A exclusive use.

It should be noted that the local router 62 is provided with a copy (not shown) of a message FIFO consumer index to the processor A for the protocol processor A exclusive use in addition to a message FIFO consumer index 6120 to the processor A for the protocol processor A.

When the message FIFO consumer index 6120 to the processor A for protocol processor A exclusive use is updated, the local router 62 increments a message FIFO consumer index 612 by means of the copy of the message FIFO consumer index to the processor A for the protocol processor A exclusive use. On this occasion, the local router 62 updates the message FIFO consumer index 612 to keep consistency with the virtual message FIFO 6111 for the protocol processor A exclusive use. Specifically, the local router 62 increments the message FIFO consumer index 612. It should be noted that the message FIFO consumer index 612 is provided for the protocol processor 61.

As a result of the above operation of the local router 62, the protocol processor 61 can transmit/receive data to/from a plurality of processors 82 by means of the same process as the transmission/reception of data to/from one processor 82.

Figure 23:
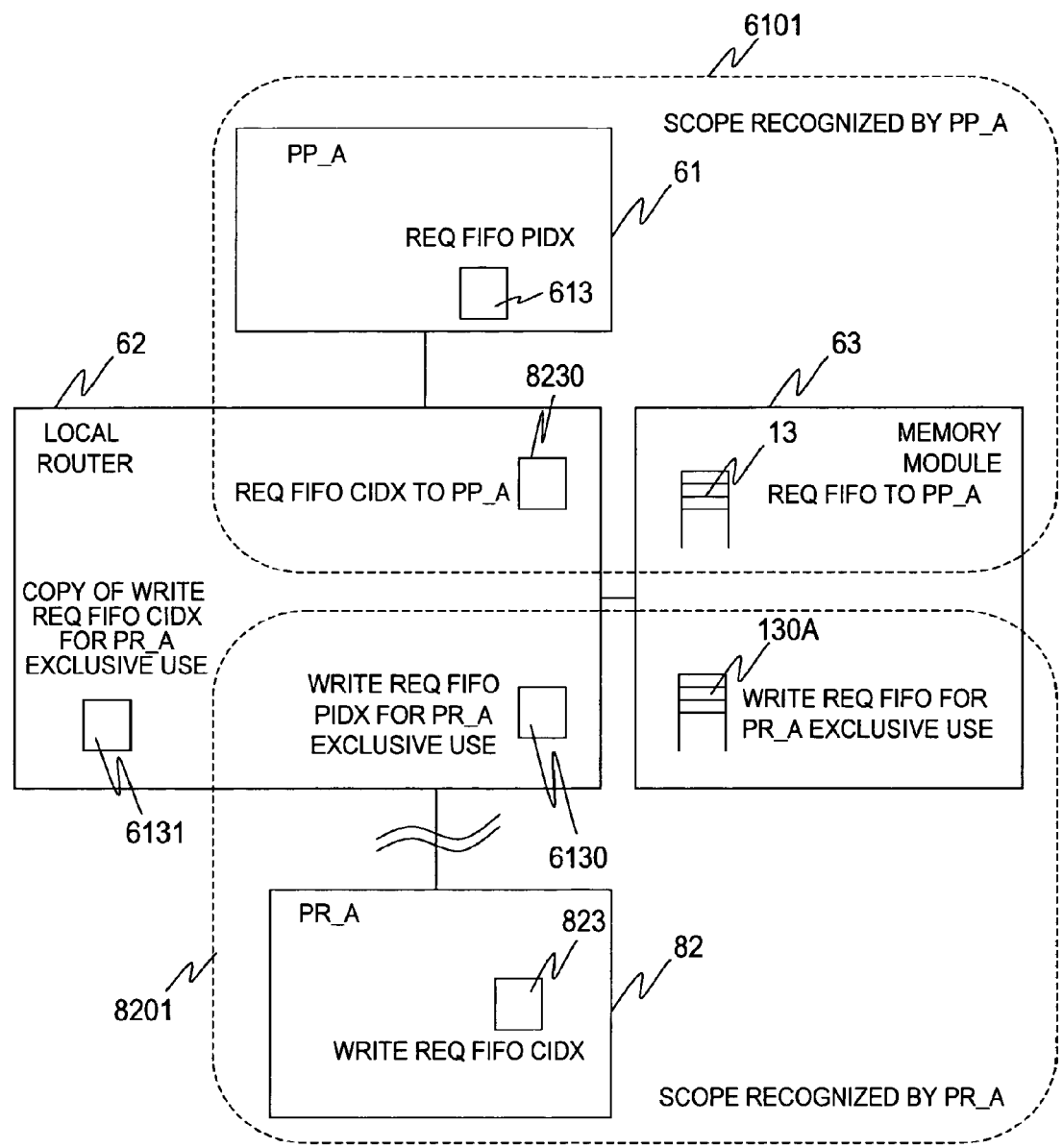
FIG. 23 describes writing to a request FIFO according to the first embodiment of this invention.

FIG. 23 describes writing to a request FIFO according to the first embodiment of this invention.

FIG. 23 shows a recognition scope 6101 of a protocol processor A61 and a recognition scope 8201 of a processor A82.

The processor A82 recognizes a write request FIFO 130A for the processor A exclusive use stored in the memory module 63 as a request FIFO 13.

The protocol processor 61 transmits an access whose transmission destination is the write request FIFO 130A for the processor A exclusive use. It should be noted that this access requests for storage of an index of a transfer list pointer.

Then, the local router 62 determines whether there is a free space in a request FIFO 13 to the protocol processor A. When there is no free space in the request FIFO 13 to the protocol processor A, the local router 62 stores the access in the write request FIFO 130A for the processor A exclusive use.

On the other hand, when there is a free space in the request FIFO 13 to the protocol processor A, the local router 62 stores the access in the request FIFO 13 to the protocol processor A by changing the transmission destination of the access.

Then, the processor 82 increments a write request producer index 6130 for the processor A exclusive use.

It should be noted that the local router 62 includes a copy (not shown) of the write request FIFO producer index for the processor A exclusive use in addition to the write request FIFO producer index 6130 for the processor A exclusive use.

When the write request FIFO producer index 6130 for the processor A exclusive use is updated, the local router 62 uses the copy of the write request FIFO producer index for the processor A exclusive use to increment the request FIFO producer index 613. It should be noted that the request FIFO producer index 613 is provided for the protocol processor 61.

Then, the protocol processor A61 extracts the access from the request FIFO 13 for the protocol processor A. Then, the processor A61 increments a request FIFO consumer index 8230 to the protocol processor A.

It should be noted that the local router 62 is provided with a copy 6131 of the write request FIFO consumer index for the processor A exclusive use in addition to the request FIFO consumer index 8230 to the protocol processor A.

When the request FIFO consumer index 8230 to the protocol processor A is updated, the local router 62 updates a write request FIFO consumer index 823 by means of the copy 6131 of the write request FIFO consumer index for the processor A exclusive use. Specifically the local router 62 increments the write request FIFO consumer index 823. It should be noted that the write request FIFO consumer index 823 is provided for the processor 82.

As a result, the processor 82 recognizes the local router 62 as the protocol processor 61. Moreover, the protocol processor 61 recognizes the local router 62 as the processor 82. Thus, the processor 82 recognizes that the only one processor 82 is connected to the protocol processor 61. Consequently, the processor 82 updates the request FIFO 13 in any timing.

Figure 24:
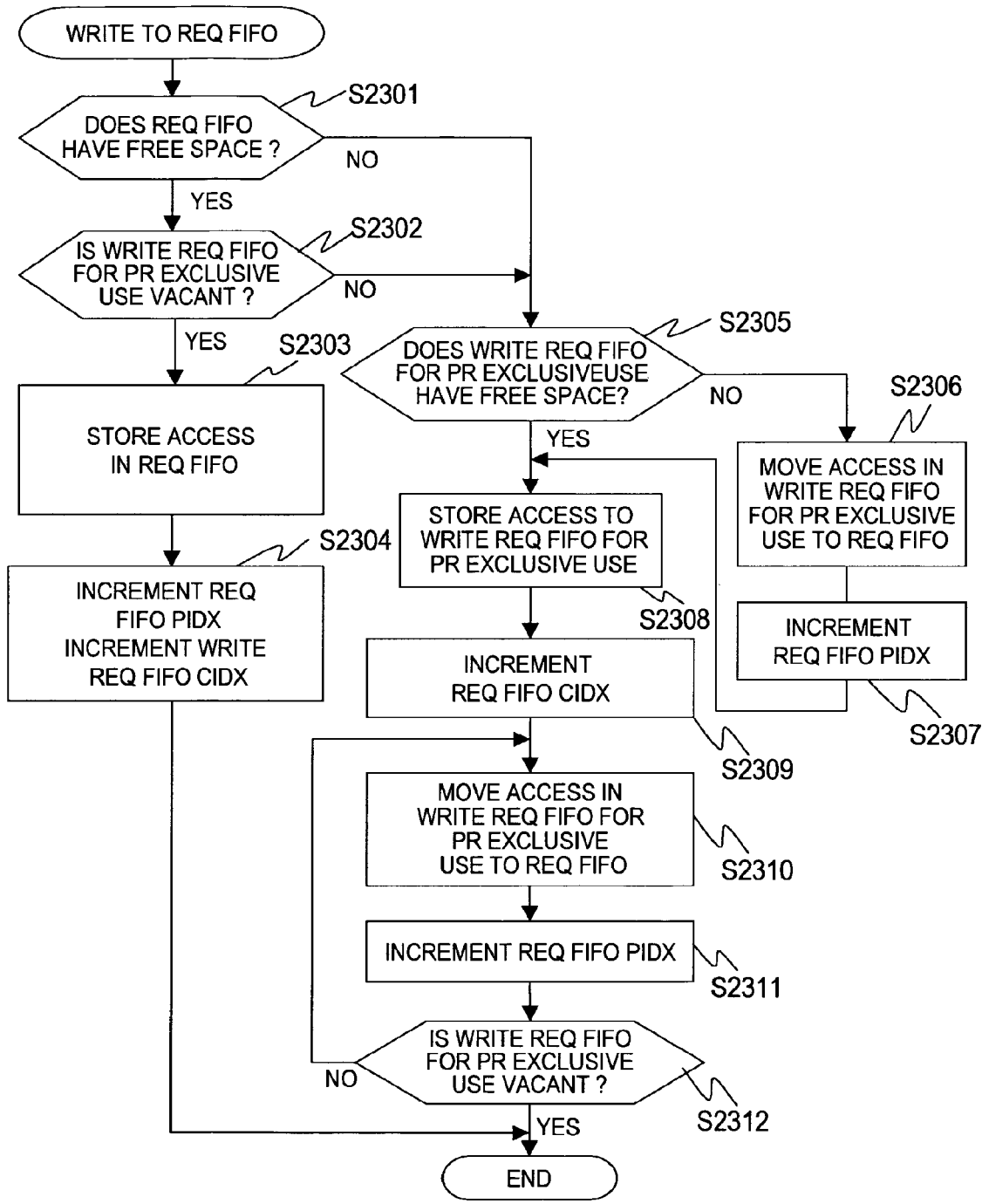
FIG. 24 is a flowchart of a process by the local router upon receiving an access addressed to the request FIFO according to the first embodiment of this invention.

FIG. 24 is a flowchart of a process by the local router 62 upon receiving an access addressed to the request FIFO 13 according to the first embodiment of this invention.

First, the local router 62 receives an access addressed to the write request FIFO 130 for the processor exclusive use from the processor 82. Then, the local router 62 determines whether the request FIFO 130 has a free space (S2301).

Specifically, the local router 62 adds "1" to the copy of the request FIFO producer index to the protocol processor. Then, the local router 62 acquires a remainder by dividing the obtained value by the number of entries of the request FIFO 13. Then, the local router 62 compares the obtained value with the request FIFO consumer index 8230 to the protocol processor. When they are equal to each other, there is no free space in the request FIFO 13. On the other hand, when they are not equal to each other, there is a free space in the request FIFO 13.

When there is a free space in the request FIFO 13, the local router 62 determines whether the write request FIFO 130 for the processor exclusive use is vacant or not (S2302).

Specifically, the local router 62 compares a copy 6131 of the write request FIFO consumer index for the processor exclusive use with a write request FIFO producer index 6130 for the processor exclusive use. When they are equal to each other, the write request FIFO 130 for the processor exclusive use is vacant. On the other hand, they are different from each other, in the write request FIFO 130 for the processor exclusive use are stored one or more accesses.

When the write request FIFO 130 for the processor exclusive use is vacant, the local router 62 stores the received access in the request FIFO 13 (S2303). Specifically, the local router 62 stores the access at a position in the request FIFO 13 corresponding to the copy of the request FIFO producer index. In other words, the local router 62 stores the access not in the write request FIFO 130 for the processor exclusive use, but in the request FIFO 13.

Then, the local router 62 increments the request FIFO producer index 613. At the same time, the local router 62 increments the copy of the request FIFO producer index.

On this occasion, the local router 62 may increment the write request FIFO consumer index 823 and the copy 6131 of the write request FIFO consumer index (S2304). Then, the local router 62 completes this process.

On the other hand, when there is no vacant space in the request FIFO 13 in the step S2301, or the write request FIFO 130 for the processor exclusive use is not vacant in the step S2302, the local router 62 proceeds to a step S2305.

The local router 62 determines whether the write request FIFO 130 for the processor exclusive use has a free space (S2305).

When the write request FIFO 130 for the processor exclusive use has a free space, the local router 62 simply proceeds to a step S2308.

On the other hand, the write request FIFO 130 for the processor exclusive use does not have a free space, the local router 62 waits until a free space is generated in the request FIFO 13. Then, when a free space is generated in the request FIFO 13, the local router 62 extracts the access stored in the write request FIFO 130 for the processor exclusive use. Then, the local router 62 stores the extracted access in the request FIFO 13. As a result, the local router 62 moves the access stored in the write request FIFO 130 for the processor exclusive use to the request FIFO 13 (S2306).

Then, the local router 62 increments the request FIFO producer index 613 and the copy of the request FIFO producer index (S2307).

Then, the local router 62 stores the received access in the write request FIFO 130 for the processor exclusive use (S2308). Then, the local router 62 increments the write request FIFO consumer index 823 and the copy 6131 of the write request FIFO consumer index 6131 (S2309).

Then, the local router 62 waits until a free space is generated in the request FIFO 13. Then, when a free space is generated in the request FIFO 13, the local router 62 extracts the access stored in the write request FIFO 130 for the processor exclusive use. Then, the local router 62 stores the extracted access in the request FIFO 13. As a result, the local router 62 moves the access stored in the write request FIFO 130 for the processor exclusive use to the request FIFO 13 (S2310).

Then, the local router 62 increments the request FIFO producer index 613 and the copy of the request FIFO producer index (S2311).

Then, the local router 62 determines whether the write request FIFO 130 for the processor exclusive use is vacant (S2312).

When the write request FIFO 130 for the processor exclusive use is not vacant, the local router 62 returns to the step S2310. Then, the local router 62 repeats the process from the step S2310 to the step S2312 until the write request FIFO 130 for the processor exclusive use becomes vacant.

On the other hand, the write request FIFO 130 for the processor exclusive use is vacant, the local router 62 simply completes this process.

As described above, according to this embodiment, the plurality of processors 82 can control the single protocol processor 61. Thus, the processors provided for the storage system can be efficiently utilized.

(Second Embodiment)

Figure 25:
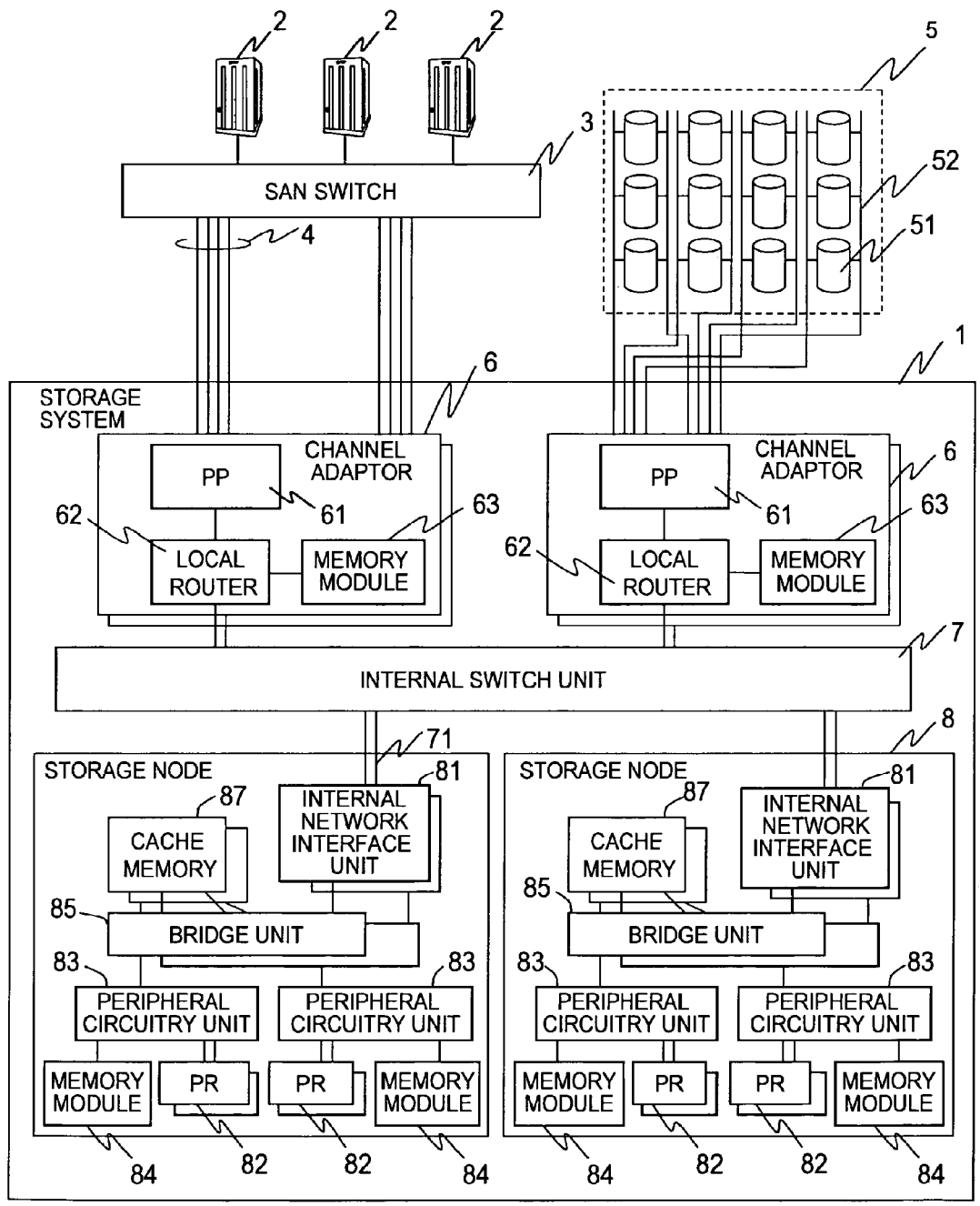
FIG. 25 is a block diagram of a configuration of a computer system according to a second embodiment of this invention.

FIG. 25 is a block diagram of a configuration of a computer system according to a second embodiment of this invention.

In the computer system according to the second embodiment, the HDD enclosure 5 is not connected to the storage node 8, but to a disk adaptor 9. The other part of the configuration of the computer system according to the second embodiment is the same as the computer system according to the first embodiment shown in FIG. 1, and will be explained in no more details.

The disk adaptor 9 includes a protocol processor 61, a local router 62, and a memory module 63. The protocol processor 61, the local router 62, and the memory module 63 are the same as those provided for the channel adaptor 6. Like components are denoted by like numerals, and will be explained in no more details.

It should be noted that the protocol processor 61 provided for the disk adaptor 9 is connected to the HDD enclosure 5.

The storage node 8 controls the HDD enclosure 5 via the disk adaptor 9. A process by the computer system according to the second embodiment is the same as that of the computer system according to the first embodiment, and will be explained in no more details.

The computer system according to the second embodiment can manage processor resources and HDD resources independently. Thus, a larger number of the processors 82 can process a smaller number of the HDD's 51. As a result, the computer system according to the second embodiment can be preferably applied to a database environment.

(Third Embodiment)

Figure 26:
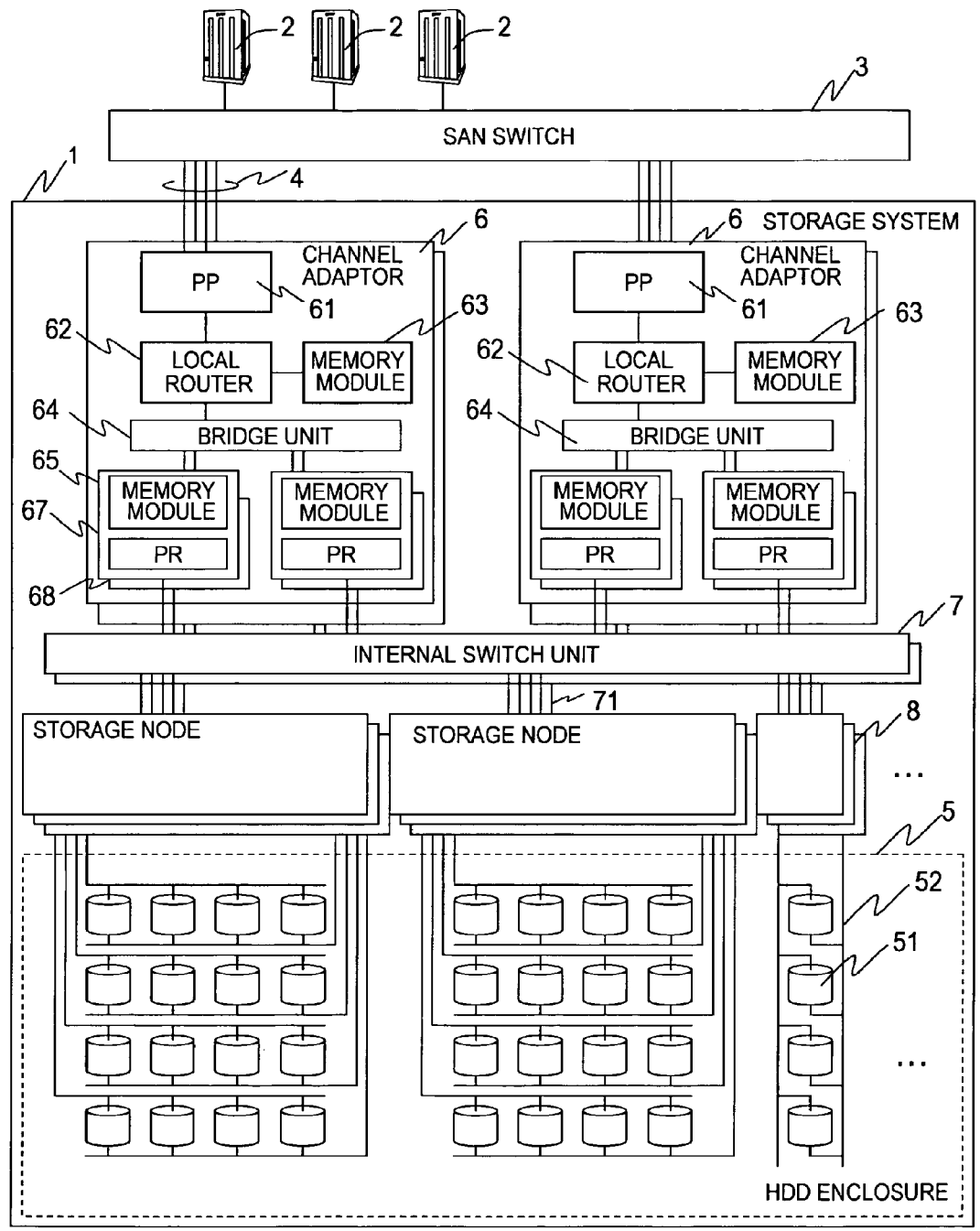
FIG. 26 is a block diagram of a configuration of a computer system according to a third embodiment of this invention.

FIG. 26 is a block diagram of a configuration of a computer system according to a third embodiment of this invention.

A configuration of the computer system according to the third embodiment is the same as that of the computer system according to the first embodiment shown in FIG. 1 except for the channel adaptor 6. Like components are denoted by like numerals, and will be explained in no more details.

The channel adaptor 6 includes the protocol processor 61, the local router 62, the memory module 63, a bridge unit 64, and front-end processor units 68.

The protocol processor 61, the local router 62, and the memory module 63 are the same as those provided for the channel adaptor 6 according to the first embodiment, and will be explained in no more details. It should be noted that the local router 62 according to this embodiment distributes accesses to front-end processors 67.

The bridge unit 64 connects between the local router 62 and the front-end processor units 68.

The front-end processor unit 68 includes the front-end processor 67 and a memory module 65.

The memory module 65 stores programs executed by the front-end processor 67 and information required by the front-end processor 67.

The front-end processor 67 executes the programs stored in the memory module 65 to carry out various types of processing. Specifically, the front-end processor 67 controls the channels 4 via the protocol processor 61. Moreover, the front-end processor 67 interprets an IO request contained in a frame received by the protocol processor 61 via the channel 4 to identify a processor 82 which is to process this IO request. Then, the front-end processor 67 communicates with the identified processor 82 to carry out a process corresponding to this IO request. For example, the front-end processor 67 inquires the processor 82 about whether data to which the IO request requests for an access is stored in the cache memory 87. Moreover, when the data to which the IO request requests for the access is stored in the cache memory 87, the front-end processor 67 inquires the processor 82 about an address on the cache memory 87 at which this data is stored.

Though communication between the front-end processor 67 and the processor 82 has a larger overhead compared with communication between the front-end processor 67 and the protocol processor 61, this configuration enables a high-performance process. Thus, the storage system 1 according to the third embodiment can distribute a load among the processors 82. Moreover, the plurality of front-end processors 67 control the channel 4. Thus, the storage system 1 according to the third embodiment can prevent the channel control from being a bottle neck of the performance. As a result, the storage system 1 according to the third embodiment can efficiently utilize the processors 82.

While the present invention has been described in detail and pictorially in the accompanying drawings, the present invention is not limited to such detail but covers various obvious modifications and equivalent arrangements, which fall within the purview of the appended claims.

What is claimed is:

1. A storage system, coupled to a host computer, comprising:
    a channel adaptor including a local router including a processor number information and a transfer list index/processor number information, and a protocol processor transmitting and receiving data between the host computer and the local router;
    a plurality of storage nodes each including a processor; and
    a plurality of disk drives to be provided as one or more logical units to the host computer, by the plurality of storage nodes;
    wherein the processor number information includes at least one logical unit number and at least one processor number of the storage nodes;
    wherein the transfer list index/processor number information includes the processor number for identifying a processor from among the processors of the plurality of storage nodes, and index information for identifying a transfer list including instruction which the processor sends to the protocol processor;
    wherein the local router determines a first processor from among the processors of the plurality of storage nodes which is to be a transfer destination of a write request based on the processor number information in response to the write request from the host computer through the protocol processor;
    wherein the first processor generates and sends to the protocol processor, a first transfer list which includes instruction for processing, and generates first index information which is an index of the first transfer list upon receiving the write request.

2. The storage system according to claim 1,
    wherein the protocol processor transmits second index information which is an index of the transfer list corresponding to a completion message of the write request and,
    wherein the local router determines a processor number to send the completion message based on the second index information and updated transfer list index/processor number information.

3. The storage system according to claim 1,
    wherein, upon the write request from the host computer, the local router determines a processor number to receive a first frame based on the logical unit number of a first frame and the processor number information, and transfers the received first frame to another processor corresponding to the determined processor number;
    wherein the another processor which receives the transferred first frame, secures a storage area in a cache memory to store the write data, and creates information indicating an address of the secured storage area;
    wherein the protocol processor acquires the created information and stores the write data in a second frame to the secured storage area, based on the created information.

4. The storage system according to claim 1,
    wherein each of the plurality of storage nodes furthermore includes a storage node cache memory, and
    wherein, in case that a transmission destination address of the data is the storage node cache memory, the local router transfers the data to the storage node cache memory.

5. The storage system according to claim 4,
    wherein, in case that the transmission destination address is a request FIFO, the local router extracts a transfer list index number of the data from the data and sends the transfer list index number of the data to the protocol processor.

6. The storage system according to claim 5,
wherein the local router, upon receipt of the data whose transmission destination address is the request FIFO, updates the transfer list index/processor number information.

* * * * *